United States Patent
Ahmavaara

(10) Patent No.: US 8,144,728 B2
(45) Date of Patent: Mar. 27, 2012

(54) ACCESS SYSTEM FOR A CELLULAR NETWORK

(75) Inventor: Kalle Ahmavaara, Helsinki (FI)

(73) Assignee: Nokia Corporation, Espoo (FI)

( * ) Notice: Subject to any disclaimer, the term of this patent is extended or adjusted under 35 U.S.C. 154(b) by 1569 days.

(21) Appl. No.: 10/467,280

(22) PCT Filed: Feb. 6, 2001

(86) PCT No.: PCT/EP01/01271
§ 371 (c)(1),
(2), (4) Date: Aug. 6, 2003

(87) PCT Pub. No.: WO02/063901
PCT Pub. Date: Aug. 15, 2002

(65) Prior Publication Data
US 2005/0101245 A1    May 12, 2005

(51) Int. Cl.
*H04J 3/16* (2006.01)
(52) U.S. Cl. .................. 370/466; 370/469; 370/310
(58) Field of Classification Search .................. 370/310, 370/315, 331, 466, 328, 329, 330, 338, 343, 370/467, 469; 455/406, 422.1, 436, 450, 455/437, 438, 442, 67.11
See application file for complete search history.

(56) References Cited

U.S. PATENT DOCUMENTS

| 5,228,029 | A | * | 7/1993 | Kotzin | 370/331 |
| 5,910,980 | A | * | 6/1999 | Ogasawara et al. | 379/142.01 |
| 5,911,120 | A | * | 6/1999 | Jarett et al. | 455/417 |
| 5,946,634 | A | * | 8/1999 | Korpela | 455/552.1 |

(Continued)

FOREIGN PATENT DOCUMENTS

WO    WO 99/52307    10/1999

(Continued)

OTHER PUBLICATIONS

Asatani et al.; "Access network architectural issues for future telecommunication networks", IEEE Communications Magazine vol. 36, Issue 8, Aug. 1998 pp. 110-114.*

(Continued)

*Primary Examiner* — Gary Mui
(74) *Attorney, Agent, or Firm* — Harrington & Smith

(57) ABSTRACT

The present invention relates to a method and system for providing access to a cellular network (8), wherein a terminal device (1) is connected to an access device (2) according to access specifications of a broadband access network (12) which is not specifically designed to be used as a part of cellular network (8). The terminal device (1) indicates to the access device (2) that it wishes to be connected to the cellular network (8), and a session or call and a radio bearer is setup between the terminal device (1) and the cellular network (8). To achieve this, a service node (5) provided in the cellular network (8) requests a suitable access bearer from the access network (12) and the access device (2) sets up a corresponding access channel towards the terminal device (1). The terminal device (1) then associates the access channel to the correct radio bearer by using a corresponding identification. Thereby, service functions of the cellular network, e.g. UMTS services, can be distributed via any access network and existing broadband or high-speed access networks can be implemented in new cellular network structures. A huge capacity enhancement can thus be offered to the network operators of the cellular network without any standardization effort or license fee and at very small investment and maintenance costs.

20 Claims, 16 Drawing Sheets

U.S. PATENT DOCUMENTS

| | | | |
|---|---|---|---|
| 5,953,323 A * | 9/1999 | Haartsen | 370/330 |
| 6,151,495 A * | 11/2000 | Rune | 455/426.1 |
| 6,154,647 A * | 11/2000 | Dahlin et al. | 455/426.1 |
| 6,208,627 B1 * | 3/2001 | Menon et al. | 370/328 |
| 6,292,667 B1 * | 9/2001 | Wallentin et al. | 455/458 |
| 6,359,877 B1 * | 3/2002 | Rathonyi et al. | 370/349 |
| 6,374,112 B1 * | 4/2002 | Widegren et al. | 455/452.2 |
| 6,411,632 B2 * | 6/2002 | Lindgren et al. | 370/466 |
| 6,751,472 B1 * | 6/2004 | Muhonen | 455/553.1 |
| 6,801,786 B1 * | 10/2004 | Korpela | 455/552.1 |
| 6,850,512 B1 * | 2/2005 | Bishop et al. | 370/342 |
| 6,996,085 B2 * | 2/2006 | Travostino et al. | 370/338 |
| 7,233,595 B1 * | 6/2007 | Hollis et al. | 370/395.2 |
| 2001/0027104 A1 * | 10/2001 | Hameleers et al. | 455/445 |
| 2001/0030950 A1 * | 10/2001 | Chen et al. | 370/329 |
| 2002/0034166 A1 * | 3/2002 | Barany et al. | 370/329 |
| 2002/0058504 A1 * | 5/2002 | Stanforth | 455/426 |
| 2002/0110106 A1 * | 8/2002 | Koo et al. | 370/341 |

FOREIGN PATENT DOCUMENTS

| | | | |
|---|---|---|---|
| WO | WO 00/18157 | * | 3/2000 |
| WO | WO 00/69186 | | 11/2000 |
| WO | WO 00/72572 A1 | | 11/2000 |
| WO | WO 00/76138 A1 | | 12/2000 |
| WO | WO 0113660 A1 | * | 2/2001 |

OTHER PUBLICATIONS

Jankovic, M.; Petrovic, Z.;Community of Yugoslav PTT, Yugoslavia This paper appears in: Communications Magazine, IEEE Issue Date: Nov. 1998 vol. 36 Issue:11On pp. 106-113 ISSN: 0163-6804References Cited: 16INSPEC Accession Number: 6107964Digital Object Identifier: 10.1109/35.733484Date of Current Version: Aug. 2006.*

3GPP TS 25.301 V3.6.0 (Sep. 2000), "3$^{rd}$ Generation Partnership Project: Technical Specification Group Radio Access Network; Radio Interface Protocol Architecture", (Release 1999), (44 pages).

3GPP TS 25.323 V3.3.0 (Sep. 2000), "3$^{rd}$ Generation Partnership Project; Technical Specification Group Radio Access Network; Packet Data Convergence Protocol (PDCP) Specification", (Release 1999), (16 pages).

* cited by examiner

ACCESS SYSTEM FOR A CELLULAR NETWORK

FIELD OF THE INVENTION

The present invention relates to a method and system for providing access to a cellular network, such as a Universal Mobile Telecommunications System (UMTS) network, via an access network which is not designed to be used as a part of the cellular network.

BACKGROUND OF THE INVENTION

Data services of the Global System for Mobile communications (GSM) have launched a new era of mobile communications. The early analog cellular modems had become unattractive to the market as they were slow and unreliable. Now the market for data is moving onwards (more bursty) and upwards (more traffic), and the standardization institutes are working towards higher data rates but more significantly also towards packet data services. This will certainly broaden the appeal to end users because data is routed more efficiently through the network and hence at lower costs, and also access times are reduced.

The general trend is for data applications to generate increasingly bursty data streams, this makes for inefficient use of a circuit switched connection. Moreover, fixed networks have seen an enormous growth in data traffic, not at least because of the rise of Internet access demand, such that it is to be supposed that mobile networks will spread as technology and customer expectations move on. The current GSM switch network is based on narrow band ISDN (Integrated Services Digital Network) circuits, so that the reason for rate limitations moves from the access network to the core network.

The new General Packet Radio Services (GPRS) network will offer operators the ability to charge by the packet, and support data transfer across a high speed network at up to eight times slot radio interface capacity. GPRS introduces two new nodes into the GMS network, a Serving GPRS Support Node (SGSN) and a Gateway GPRS Support Node (GGSN). The SGSN keeps track of the location of the mobile terminal within its service area and sends and receives packets to/from the mobile terminal, passing them on or receiving them from the GGSN. The GGSN then converts the GSM packets into other packet protocols (e.g. IP or X.25) and sends them out into other networks.

Services like multislot data and GPRS are very useful in moving the base technologies forwards, but if the same goals can be achieved with the existing data services, services on the current networks should be prototyped. Therefore, a standardized mobile access mechanism for fixed network services, focussing on increasing the effective throughput and immunity to dropped calls and thus reducing the needed airtime should be established. UMTS will deliver advanced information directly to people and provide them with access to new and innovative services. It will offer mobile personalized communications to the mass market regardless of location, network or terminal used.

Cellular radio frequencies are usually owned as licensed bands by the network operators. The huge licensing fees lead to rigid licensing procedures which make it difficult to maintain a healthy and non-discriminatory competition environment. Currently, a strictly separate usage of owned access resources by individual network operators can be observed. Hence, ownership of frequency bands or spectrum is considered to be a key factor of success for the operator's business.

To achieve a wide area coverage at increasing amounts of network traffic, smaller cell sizes are required, which makes network planning more and more difficult and leads to increased site acquisition costs and radio access network investments. Moreover, huge and rigid standardization efforts are required to introduce new access systems.

However, given the massive investments that have been made in existing networks of all types, and the enormous capital value that still attaches to most of them, operators and users will wish to continue to exploit them until the end of their useful lives. Almost all existing networks can be used as access networks for IP-based services. Therefore, interoperability between UMTS terminals and other IMT-2000 (International Mobile Telecommunications-2000) network family members, or even non-UMTS access networks is a key requirement. In particular, UMTS operators should be able to use common access networks owned by other access network providers, while the user has subscription only with the UMTS operator.

SUMMARY OF THE INVENTION

It is therefore an object of the present invention to provide a method and system for providing access to a cellular network, by means of which access facilities can be increased.

This object is achieved by a system for providing access to a cellular network, the system comprising:
   at least one access device for establishing a connection to a cellular network via an access network which is not specifically designed to be used as a part of the cellular network; and
   a service node specifically designed to be used as a part of the cellular network and arranged to request an access bearer from the access network in response to a setup request received from the at least one access device.

Furthermore, the above object is achieved by a method of providing access to a cellular network, the method comprising the steps of:
   establishing communication means between a terminal device and an access network which is not specifically designed to be used as a part of the cellular network;
   indicating by the terminal device to the access network that a connection to said cellular network is required;
   sending a request for connection setup from the access network to the said cellular network;
   establishing a data transfer means between the access network and said cellular network;
   indicating to the terminal device that a communication with said cellular network is enabled and optionally modifying the data transfer means between the terminal device and the access network; and
   signaling from the terminal device to said cellular network via the established data transfer means.

Additionally, the above object is achieved by a terminal device for providing an access to a cellular network, the terminal device comprising:
   higher layer protocol means for providing a signaling function to the cellular network;
   lower layer protocol means for providing a signaling function to an access network which is not specifically designed to be used as a part of the cellular network; and
   adaptation means for providing an adaptation between the lower layer protocol means and the higher layer protocol means so as to establish a transparent connection to the cellular network through the access network.

Moreover, the above object is achieved by a network node for providing access to a cellular network, the network node comprising:

higher layer protocol means for communicating with a terminal device via an access network which is not specifically designed to be used as a part of the cellular network; and lower layer protocol means for signaling with the non-integrated access network to request a suitable access bearer from the access network;

wherein the suitable access bearer is used to establish a transparent connection between the terminal device and the network node through the access network.

In addition thereto, the above object is achieved by an access device for providing access to a cellular network, the access device comprising:

higher layer protocol means specific to the cellular network, for receiving from a terminal device a signaling indicating a request for a connection to the cellular network; and lower layer protocol means specific to an access network which is not specifically designed to be used as a part of the cellular network, the lower layer protocol means being arranged to handle the setup of a connection to a service node of the cellular network via the access network in response to the receipt of the signaling and to setup a requested type of access channel towards the terminal device, which has been requested by the service node.

Throughout the present application, the term "access network which is not specifically designed to be used as a part of the cellular network" is intended to designate any independent access network, non-integrated access network and/or external access network which is not specifically adapted to be used as a part of the cellular network which is to be accessed. This means e.g. that the access technology of the access network is not specifically designed to be used as a part of the accessed cellular network. The access network may be based on non-licensed technology such that it may be shared by different cellular operators to provide access to their cellular networks. The access network may be connected to the cellular network in an add-on way, i.e. by preserving major characteristics of the access network and the cellular network, respectively, as defined by existing standards and specifications. For example, an access network operating in an unlicensed broadband typically is different in its characteristics from a cellular network operating in a licensed band. Moreover, protocol standards or signalings may differ in some or all protocol layers.

Accordingly, a system concept for a cellular network is provided, in which independent access networks can be used as alternative radio access facilities for the cellular network, e.g. a UMTS network. Thereby, seamless access to all services of the cellular network can be provided over various radio access systems. As an example, a UMTS over broadband radio system can be established, which supports seamless access to all UMTS services and will deploy UMTS mobility management principles.

This provides to the users of mobile terminals the advantages that a very convenient high-speed wireless system for home, office and other hot-spot environments can be established, such that attractive public wireless services can be provided at reasonable prices. Furthermore, the same type of service can be used at any location, since cheap and fast hot-spot systems can be handed over to the global cellular umbrella and leaving a hot-spot.

Due to the transparent connection through the access network, the GSM/UMTS security functions can be moved to new wireless devices. The user can rely on secure payments and other confidential transactions provided by the familiar operator over the new system and thus may start to use e-commerce. Thus, any UMTS service can be provided globally via any compatible access network.

As regards network operators, an easy way is provided to become a major wireless Internet service provider. In particular, a huge capacity enhancement can be offered without major new technology developments or standardization efforts and license fees, while only very small investments and maintenance costs are required for the additional service nodes. Thereby, access costs are reduced for the network operators, since common access networks can be shared by different operators. Moreover, even different radio technologies may be used to access the same services, while the best radio technology may be chosen for each environment. The operator can concentrate on the core business which has the best margins and may leave the broadband access handling to other parties. The role of the backbone service provider is thereby separated from the role of the access provider, and more modular system structures can be developed with radio access systems being more separated from the remaining cellular infrastructures.

Additionally, a new type of business is generated for the provision of access networks, which is performed by the owners of existing and future distribution or access networks. Additionally, the access devices become consumer products rather than part of an invisible access network infrastructure, since the access providers have to install corresponding access devices for providing the transparent connection through their access or distribution networks. The network terminals may be arranged as specific terminals adapted to their point of use, or as cellular dual mode terminals which can be used in any environment.

Thus, the new access system offers on one hand operators the possibility to extend their cellular service offering to new environments like homes or public hot-spots and on the other hand it dramatically increases the radio capacity available for future cellular services. The system can be used as a UMTS capacity enhancement and as a low cost and high bit-rate radio extension e.g. in homes or indoor or outdoor hot-spot areas where utilization of low cost and high bit-rate services and continuous reachability from the UMTS backbone network is desired. Thereby, seamless access to all UMTS services can be provided, and the access networks can be introduced as alternative or additional radio access technologies for UMTS.

The connection may be established to a terminal device arranged to connect to at least one access device according to the access specifications of the access network. Furthermore, terminal device may be arranged to indicate a connection request to the at least one access device by using an adaptation layer signaling of said cellular network, the adaptation layer signaling being adapted to provide a mapping functionality between the lower layer protocols of the access network and the higher layer protocols of the cellular network. Then, the terminal device and the cellular network establish or re-establish a session, call or/and a radio bearer. The establishment or re-establishment of the session or call may be achieved by an SM (Session Management) or SIP (Session Initiation Protocol) signaling, while the radio bearer may be established or re-established by an RRC (radio resource control) signaling. Specifically, the higher layer protocol functions of the terminal device may be based on UMTS protocol functions that operate on top of the UMTS transport channels in the UMTS protocol architecture.

According to an advantageous embodiment, the service node is a broadband service node arranged to request the access bearer by initiating a bearer setup procedure according to a signaling protocol specified between the access network and the cellular network. Preferably, the access bearer is selected from an agreed set. The terminal device is then arranged to associate an access channel set up by the access device to a correct transport channel or another similar cellular network resource of the cellular network by using a transport channel or similar cellular resource identification.

Preferably, a UDP transport means is setup between the access device and the service node.

As regards the billing function, the at least one access device or another network device of the access network may be arranged to monitor resource usage by an active connection between a terminal device and a cellular network and to report the monitoring result to the centralized network device or gateway device which is arranged to sort the resource usage according the originating cellular network and to increase an access resource charging bill for the operator of the originating cellular network according to predetermined rules agreed for the setup access bearer type, and to allocate a corresponding capacity for the data transmission.

The service node may distribute a broadcast information of the cellular network such as System Information or Paging messages to the gateway device, and the gateway device may then distribute the system information to connected access devices.

In particular, for the established communication between the terminal device and the cellular network via the non integrated Access Network, the service node may provide predetermined functions of the cellular network, comprising radio bearer management, encryption, IP-header compression, RLC level segmentation and/or retransmission, and MAC multiplexing. It may be split into separate user plane gateway and control plane servers. Furthermore, the service node can be connected to an SGSN by a standard Iu interface and/or to other service or switching nodes by an Iur signaling interface for supporting seamless interservice node and interaccess system handovers.

The access network may be a network, e.g. a broadband radio access network, arranged separately from the communication system on which the cellular network is based. It may be used for accessing several ones of the cellular network, which may be a UMTS infrastructure network. In particular, the access network may be arranged to use BLUETOOTH® (BT), IEEE 802.11a/b, IEEE 802.15, or BRAN HL2 based radio technology. Additionally, the access network may be arranged to be used for establishing a connection to other types of networks which differ from the cellular network. It may provide alternative methods specific to the access network so as to realize lower layer protocol functions of integrated access networks specifically designed to be used as a part of the cellular network. Specifically, the access network may be a multipurpose access network adapted to offer transport services for the cellular network, and the cellular network may be an access independent network adapted to be able to utilize transport services provided by several types of access networks.

The terminal device may be arranged to scan the signal strength of other access devices and to perform handover by starting a normal connection establishment procedure towards a new access device. As regards the data transport functions of the access system, transport channel data streams of the cellular network may be transported on top of transport bearers between the access network and the cellular network and on top of the communication channels provided by the access technology of the access network between a terminal device and the access network. Only dedicated transport channels of the cellular network may be used in integrated system parts specifically designed to be used as a part of the cellular network, when a connection is established via the access network. Then, the access network may provide a mapping function for mapping the dedicated transport channel data streams of the cellular network to the communication channels provided by the access network.

The cellular network may provide a mapping function for mapping a desired service quality to the communication channel characteristics of the access network, and to use the mapped communication channel characteristics to request a transport service from the access network for a data stream to be established.

The access device may use an indicated scheduling information and defined mapping rules between time references and its internal clock for scheduling broadcast messages of the cellular network.

According to another advantageous embodiment, an association between a particular data stream of the cellular network between the terminal device and the cellular network and a particular communication channel between the terminal device and the access network is achieved by transferring a binding information both directly from the cellular network to the terminal device and from the cellular network via the access network to the terminal device upon setting up the data stream and communication channel, respectively.

A signaling specific to the cellular network may be carried out via the set up bearer transparently through the access network which is arranged to only allocate the respective capacity. Preferably, broadcasting and paging channels are multiplexed to one access specific channel. Furthermore, a broadcasting channel with the same address or logical location may be used for a group of access devices of the access network, and the terminal device may be arranged to listen to only one channel while changing between access devices of the same group. The broadcast channel of the access network may be adapted to broadcast broadcast information originating from the cellular network. The scheduling of the broadcast information of the cellular network by the access network is preferably compatible to the scheduling of the broadcast information of the cellular network by an integrated access network arranged as a part of the cellular network. The access network may receive from the cellular network messages to be broadcasted together with a scheduling information used for broadcasting. Then, the scheduling information may indicate time references of the cellular network at which the broadcast message shall be sent by the access network.

The terminal device may be arranged to use its power saving features specific to the cellular network when monitoring a broadcast information of the cellular network via the access network, by determining compatible transmission times for pieces of broadcast information of the cellular network and by activating its receiver functions only at required time instances.

When the connection is set up, a set of lower layer functions of the cellular network may be disabled and the corresponding functions of the access network may be used instead. An identity utilized by the cellular network for the user of the terminal device and/or for the terminal device itself does not have to be notified to the access network. The terminal device may be arranged to establish a new connection with the access network, which is not associated to a previous connection by the access network, when the terminal device moves from the coverage or cover area of one access device to the coverage or cover area of another access device of the access network. Furthermore, the terminal device may be arranged to inform only an identifier of the cellular network to the access network, when the terminal device contacts the access network for accessing the cellular network.

Regarding the timing function of the access system, a timing reference, e.g. SFNs, of the infrastructure of the cellular network may be mapped to specific timing references of the access network.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

In the following, the preferred embodiment of the method and system according to the present invention will be described on the basis of a wireless broadband UMTS based system in which independent broadband wireless access networks are introduced as alternative or additional radio access technologies for UMTS. Thus, such a UMTS over broadband radio system supports a seamless access to all UMTS services.

Figure 1:
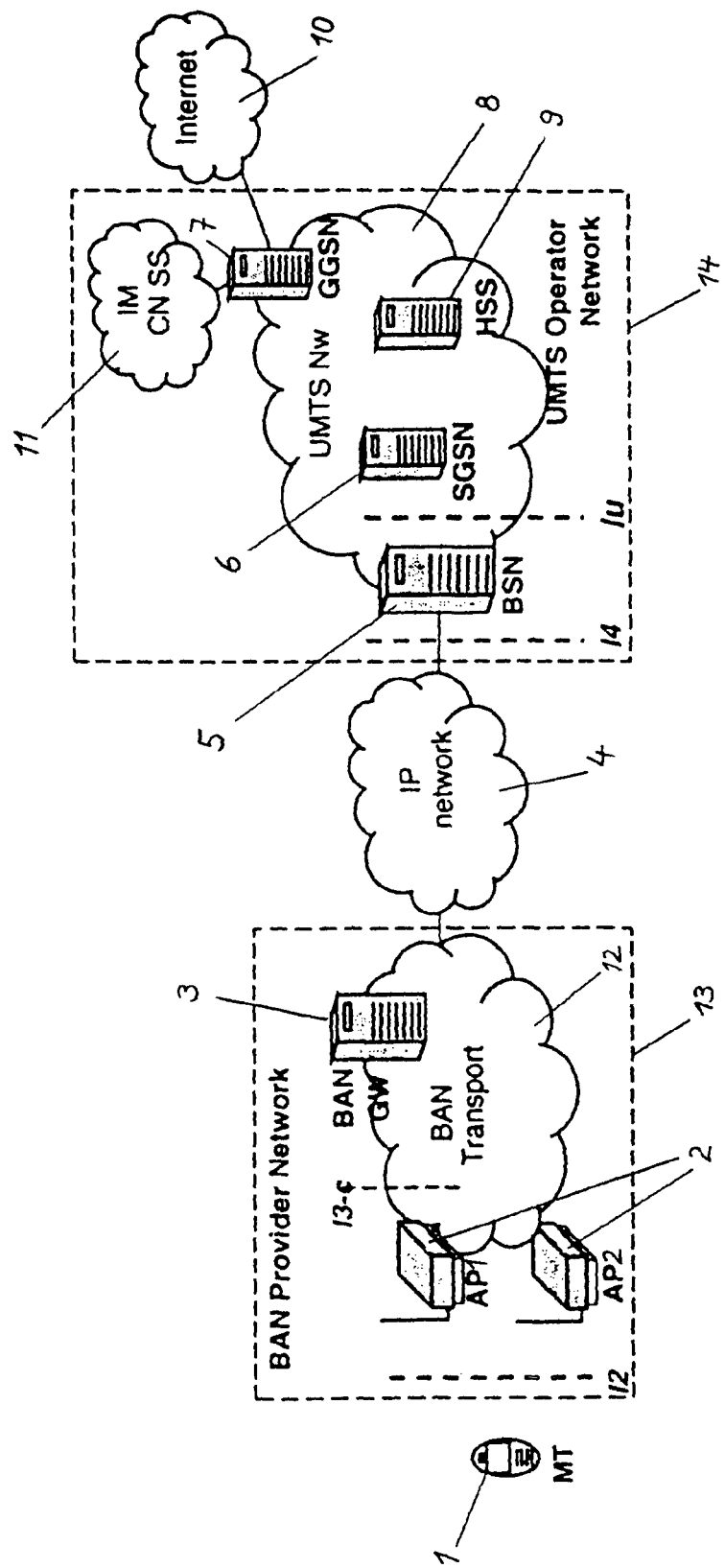
FIG. 1 shows a schematic block diagram of a network configuration comprising an access system according to the preferred embodiment.

FIG. 1 shows a schematic diagram of the network architecture according to the preferred embodiment, wherein a broadband access provider network (BAN provider network) 13 is connected via an IP (Internet Protocol) network 4 to a UMTS operator network 14. The access system is usable for UMTS radio capacity enhancement in environments suitable to broadband radio. According to FIG. 1, the access system comprises one or a plurality of UMTS backbone networks 8 operated by a UMTS operator, and one or a plurality of broadband access networks 12 (BAN networks) operated by independent access network providers. Thus, the BAN networks 12 can be regarded as non-integrated or independent or external access networks. The BAN network 12 may be based on a non-licensed radio technology and thus a common BAN can be shared between cellular network operators. In particular, the access system comprises a Iu interface to the UMTS backbone network 8 and a simple IP based interface I-4 to the BAN network 12 (non-integrated access network), wherein only very basic connection establishment/release and data transport services are provided by the interface I-4. The BAN network 12 consists of access points (APs) 2 for providing a radio access by establishing a radio-connection to a mobile terminal (MT) 1. Furthermore, a control server or gateway device called BAN gateway (BANGW) 3 acts as a distributor and broker for control signaling between access points 2 and the UMTS network 8. Thus, the access points 2 terminate the broadband radio interface. The BANGW 3 is arranged to hide the internal logical structure of the BAN network 12 from external networks. User plane connections are established logically directly between the access points 2 and the UMTS network 8. In general, the access points 2 may correspond to any kind of access device which may comprise a general purpose physical access point and a separate physical node behind the access point handling cellular connection specific functions.

The BAN network 12 is connected to a new logical UMTS network element or service node called Broadband Service Node (BSN) 5 and added to the UMTS network 8 to provide an interface functionality towards the BAN network 12. The function of the BSN 5 corresponds to a Serving RNC (Radio Network Controller) of the UMTS network 8. However, the BSN 5 may not be arranged to manage BAN radio resources, and the conventional Iub interface is replaced by the above mentioned simple I-4 interface towards the BAN network 12. The functions of the BSN 5 include radio bearer management, UMTS encryption, UMTS IP header compression, UMTS RLC (Radio Link Control) level segmentation and retransmission, a possibility for UMTS MAC (Medium Access Control) multiplexing.

It is noted that, due to its non-licensed radio technology, the BAN network 12 may be shared by several UMTS networks.

In practice, the BSN 5 may be split into separate user plane gateway and controlled plane server functions. The BSN 5 is connected to an SGSN 6 of a GPRS core network via a standard Iu interface and may be connected to other BSNs and RNCs by Iur signaling interfaces for supporting seamless inter BSN and inter access system handovers. Furthermore, the GPRS network of the UMTS network 8 comprises a GGSN 7 which provides a gateway function to the Internet 10 or other external networks 11 like e.g. corporate networks (CN) or IP-based multimedia networks (IM). Additionally, a home subscriber server (HSS) 9 is provided as a subscriber data base for storing subscriber specific information. The function of the HSS 9 corresponds to the function of the home location register (HLR) of a circuit switched network environment.

The mobile terminal 1 is arranged to establish an access specific association with one of the access points 2. In particular, the establishment of access specific connections such as BRAN DLC (BRAN Data Link Control) user connections for UMTS data streams can be triggered by the mobile terminal 1. Furthermore, existing UMTS data streams can be mapped to access specific channels of the BAN network 12, e.g. BRAN DLC user connections. The mobile terminal 1 may provide an operating access specific air interface as defined e.g. in the ETSI BRAN HL2 (HIPERLAN 2) specifications. To achieve this functions, the mobile terminal 1 may comprise a protocol function of an operating access specific UMTS convergence layer (UMTS CL), a UMTS C-plane functionality for operating a simplified version of the UMTS RRC (Radio Resource Control) protocol mainly for bearer and mobility management and UMTS higher layer protocols, such as mobility management (MM) and session management (SM). Furthermore, the mobile terminal 1 comprises a UMTS U-plane functionality for operating UMTS PDCP (Packet Data Convergence Protocol) and RLC (Radio Link Control) protocols. Thus, the mobile terminal 1 provides UMTS higher layer protocols with C-plane and U-plane functionality and broadband radio protocols with C- and U-plane functionalities. Thereby, control and user signalings can be provided to the UMTS network 8 and also to the BAN network 12.

The access points 2 are arranged to broadcast system information of a cellular network (e.g. the UMTS network 8) via the BAN access interface according to an adaptation layer protocol, e.g. an access specific UMTS convergence layer, and to communicate as a client with the BANGW 3 by a signaling protocol or application. In the following, this signaling protocol or application is called access network control protocol (ANCP) and is required to exchange signaling messages between the non-integrated access network (e.g. the BAN network 12) and the cellular network (e.g. the UMTS network 8). This signaling is related to setting up and release of connections for individual terminal devices or user equipment, setting up and release of data streams between the terminal devices or user equipment and the UMTS network 8, as well as distribution of broadcast information for idle mode terminal devices. This kind of protocol is run on top of a signaling means or signaling bearer which can be based on SCTP, UDP, TCP or similar transport means, or even the signaling parameter exchange can be realized by an SNMP message transfer as described in the present exemplary embodiment. The adaptation layer protocol is required to provide a mapping functionality between the lower protocol layers of the BAN network 12 and the higher protocol layers of the UMTS network 8. This mapping functionality is adapted to make the BAN specific protocols look like the protocols replaced from the UMTS network 8 by these BAN specific protocols. The adaptation layer protocol is terminated in the mobile terminal 1 and in the access points 2. The functions of the adaptation layer protocol comprise scheduling the UMTS network broadcast information over the BAN access interface according to the scheduling information provided to the BAN network 12 by the UMTS network 8, and mapping access interface data streams to the data streams between the BAN network 12 and the UMTS network 8. In the connection and data stream setup phase this protocol is used to exchange UMTS network related information between the access points 2 and the mobile terminal 1 to provide a means for a successful establishment of a communication or data transfer means between the mobile terminal 1 and the UMTS network 8.

Furthermore, the access points 2 are arranged to map access specific channels such as BRAN DLC user connections to BAN transport bearers of the BAN network 12. Additionally, the access points 2 operate access specific air interfaces according to the BAN network specifications and also the adaptation layer protocol (e.g. access specific UMTS convergence layer protocol). In addition thereto, an accounting function for collecting accounting information (amount of bytes, elapsed time) of active connections may be provided in the access points 2. Thus, the access points 2 provide a mapping function between radio channels and BAN transport bearers, and a security association with the BAN gateway 3.

The BAN gateway 3 communicates as a client with the BSN 5 by using the ANCP provided for BAN signaling link management. On the other hand, the BAN gateway 3 communicates as a server with the access points 2 by using the ANCP. Thus, the BAN gateway 3 is arranged to map data flows between internal and external transport bearers with respect to the BAN network 12. Thereby, a security association can be established between the BAN gateway 3 and any access point and the BSN 5. Additionally, the BAN gateway 3 can act as a signaling proxy and distributor between the access points 2 and the BSN 5, while the logical structure of the BAN network 12 is hidden from the BSN 5. The BAN gateway 3 may additionally be arranged to provide backbone system information and a paging distribution function to the access points 2. The interface between the BAN gateway 3 and the access points 2 is called I-3 interface. Furthermore, the interface between the access points 2 and the mobile terminal 1 is called I-2 interface.

The BSN 5 is arranged to provide a maintenance function of the UMTS connection with a mobile terminal by running a limited or reduced UMTS RRC protocol, and to provide a maintenance function of UMTS data flows with the mobile terminal 1 by running UMTS PDCP and limited or reduced RLC protocols. In particular, the BSN 5 communicates as a server with the BAN gateway 3 by using the ANCP, and communicates with the SGSN 6 by using a signaling defined for the UMTS Iu interface. Thus, the BSN 5 provides a data transport function to and from the BAN network 12. While the UMTS signaling is managed towards the mobile terminal 1, a security association is established with the BAN gateway 3, a connection and bearer management is provided towards the BAN network 12 with the ANCP, and the usual UMTS interface is provided to the SGSN 6.

Figure 2:
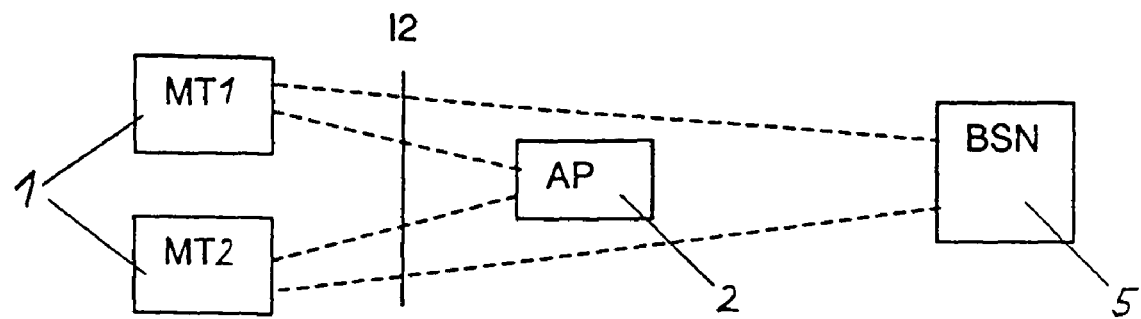
FIG. 2 shows an interface architecture of an air interface according to a preferred embodiment.

FIG. 2 shows an interface architecture of the I-2 interface between the mobile terminal 1 and the access points 2. In FIG. 2, a situation is shown, where two mobile terminals 1 are connected to one of the access points 2 and the BSN 5. The I-2 interface is an air interface which consists of two parts, a UMTS part and an access specific part. The UMTS part is terminated in the BSN 5 and the access specific part is terminated in the respective access point 2. An access point 2 may communicate with one or several mobile terminals 1, while the mobile terminal 1 communicates only with one access point 2 at one time.

The access specific part of the interface I-2 complies with the broadband radio technology lower layers, e.g. BRAN HL2 PHY (Physical layer) and DLC or equivalent layers of BT or WLAN (Wireless Local Area Network) access technologies. In the UMTS part, the higher layers are defined for UMTS L2 (e.g. MAC, RLC, PDCP) and L3 (RRC, MM, SM), while certain restrictions for the usage of UMTS protocols over the access systems may be implemented. The UMTS specific part is transparent to the access points 2. The air interface I-2 and the access points 2 are arranged to transport transmission and scheduling of UMTS system information broadcast messages. Thus, as can be gathered from FIG. 2, a lower layer signaling may be established between the mobile terminals 1 and one of the access points 2, and a higher layer signaling may be established between the mobile terminals 1 and the BSN 5 via the BAN network 12.

Figure 3:
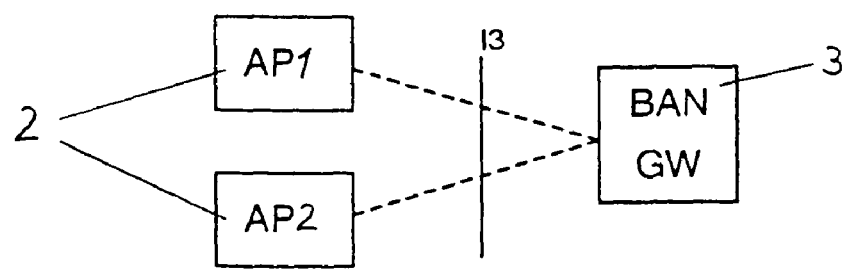
FIG. 3 shows an interface architecture of an interface between an access point and a gateway device of an access network.

FIG. 3 shows an interface architecture of the I-3 interface between the access points 2 and the BAN gateway 3. The BAN gateway 3 is a centralized control entity in the BAN network 12. The functions of the BAN gateway 3 are more related to the transport network level than to the radio network level. At the radio network level, the function of the BAN gateway 3 is to distribute broadcast information to correct access points and to handle initialization of individual access points. The BAN gateway 3 may be connected to one or several access points, while every access point can be connected to only one BAN gateway 3. The I-3 interface is a BAN internal interface and is based on IP transport functions. The access points 2 and the BAN gateway 3 communicate which each other by a specific application layer protocol of the access system which is called ANCP, and which is defined in the ETSI 3GPP specification TS 25.301, "Radio Interface Protocol Architecture". The ANCP provides common procedures not specific to a particular mobile terminal and dedicated procedures specific to a particular mobile terminal. In general, the ANCP can be any signaling protocol required between an access network (e.g. the BAN network 12) and a cellular network (e.g. the UMTS network 8). Then, this signaling protocol or signaling application is run on top of a signaling bearer which might be e.g. SCTP (Stream Control Protocol), TCP or UDP, SNMP (Simple Network Management Protocol) or some other suitable signaling bearer capable of carrying signaling messages between two networks. For common ANCP procedures, one ANCP link is established between one of the access points 2 and the BAN gateway 3. The common ANCP is used to deliver UMTS broadcast and paging information to the access points 2. A dedicated ANCP connection is dynamically established by the access points 2 for every mobile terminal accessing the network via a respected one of the access points 2. Each dedicated ANCP connection is arranged to utilize its own signaling protocol link separated from each other by their transport addresses e.g. UDP (User Datagram Protocol). The dedicated ANCP connection is used to setup and release user plane transport bearers between one of the access points 2 and the BAN gateway 3. However, it is to be noted that the user plane for transporting UMTS data streams between the access point 2 and the UMTS network is not logically routed via the BAN gateway 3, as described in the following with reference to the interface I-4.

Figure 4:
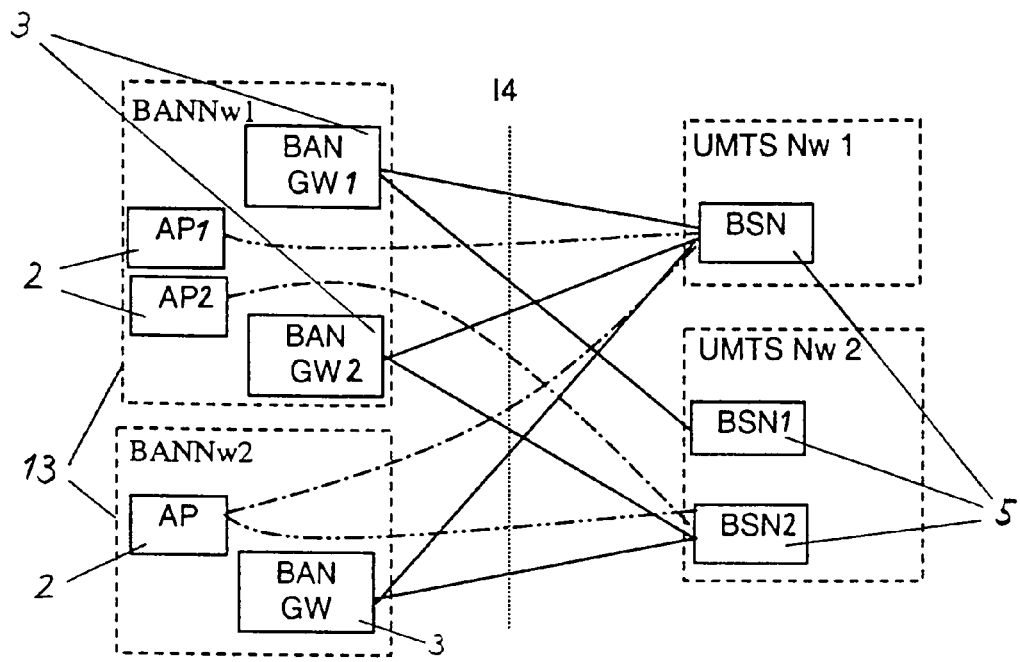
FIG. 4 shows an interface architecture between an access network and a service node of the UMTS network.

FIG. 4 shows the architecture of the I-4 interface. This interface connects individual BAN networks to UMTS networks. This interface is thus assumed to be between two legal entities, the BAN provider and the UMTS operator. One BAN network can be connected to several BSNs in one or several operators networks, and the BSN 5 may be connected to one or several BAN networks provided by one or several BAN providers. As indicated in FIG. 4, the user plane for transporting UMTS data streams is routed directly between the access points 2 and the corresponding BSNs 5 of the two UMTS networks (cf. dash-dotted lines in FIG. 4).

To support accessing UMTS services via the BAN network 12, the UMTS operator is required to install corresponding BSN nodes in the UMTS network 8. When a service provisioning in a given area is agreed with a BAN provider, secure communication between the BAN gateways of the BAN providers and the BSNs of the UMTS operators must be established. This requires a configuration of each others IP addresses to the network elements, or other corresponding arrangements by means of which the BAN network 12 can find the address (e.g. IP address) of the BSN 5. In addition thereto, a configuration of a UMTS operators network code (e.g. PLMN ID) to the BAN gateway 3 and an agreement on the method and algorithm used for authentication of control messages to be exchanged between the BAN gateway 3 and the BSN 5 are required. The BAN provider must ensure that similar security and connectivity is also provided within the BAN network 12, i.e. between the access points 2 and the BAN gateway 3.

Furthermore, agreement has to be reached with regard to the services to be provided and the billing of those. As an example, the BAN provider may bill the UMTS operator for the transport bearers used to convey UMTS data streams between user terminals and the operators UMTS network 12 for users connected to the UMTS network 8 via the BAN network 12. To achieve this, the UMTS operator and the BAN provider should beforehand agree on what kind of access specific transport means the BAN network 12 will be requested to provide for UMTS data streams towards the UMTS network 8. The access points 2 in the BAN network 12 are arranged to support certain air interface standards with certain versions. The UMTS operator may define mapping rules between UMTS QoS (Quality of Service) and the QoS as defined by the air interface standards (I-2 interface) that are utilized within the BAN network 12. When establishing a transport function for new UMTS data streams, these mapped parameters should be provided to the BAN network 12 from the UMTS network 8. In addition to a set of possible types of transport bearers, also the billing rules for each of those bearers should be agreed.

When a new UMTS radio bearer needs to be established, the BSN 5 in the UMTS network 8 requests to setup a suitable transport bearer from the agreed set or decides to multiplex the new UMTS radio bearer to one of the already existing transport bearers by UMTS specific means. If a new transport bearer is required, the BSN 5 issues a command to the BAN network 12 to set up this kind of transport bearer by issuing the mapped air interface QoS parameters for the desired access specific channel to the BAN network in a UMTS DATA STREAM SETUP (UDS SETUP) message of the ANCP. The UDS SETUP message is a clear indication to the BAN network 12 about the characteristics of the required BAN air interface radio link. After the bearer has been setup, both the access point 2 and the BSN 5 can start collecting billing information according to the billing principles agreed for the established transport bearer type. The access point 2 collects this billing information and sends it occasionally to a billing server provided in a BAN network 12. The BAN provider issues a bill to the UMTS operator according to their agreed way of handling invoicing. The BAN provider is not aware of the user identities, such that a user specific charging is not possible and not even desired due to user identity information confidentiality. In particular, the access points 2 or another device in the BAN network 12 monitors the BAN resource usage by each active connection between mobile terminals and a specific cellular network (e.g. the UMTS network 8) via the BAN network 12. This device then reports this resource usage or an accounting information to a centralized device in the BAN network 12 e.g. by an AAA protocol (accounting, authentication and authorization protocol). This centralized device collects the resource usage and sorts it according to the originating cellular network. This accounting information is then used to charge the BAN usage from each operator of the cellular networks.

The UMTS operator of the UMTS network 8 should collect the charging information of individual users or their BAN usage. This can be done as normally in UMTS by issuing CDRs to a billing center of the UMTS network 8 from the SGSN 6. The UMTS operator may as well collect information for checking the billing of the BAN provider. This function may reside in the BSN 5.

Figure 5:
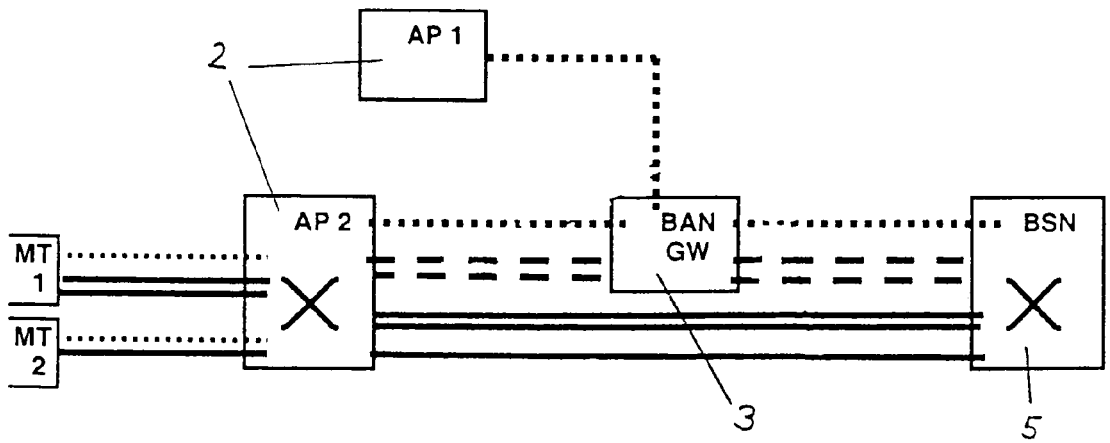
FIG. 5 shows a schematic block diagram indicating access network addressings and connections.

FIG. 5 shows a schematic diagram indicating BAN addressing and connections. In the case shown in FIG. 5, no mobile terminal is associated with a first access point AP 1 and two mobile terminals MT 1 and MT 2 are associated with a second access point AP 2. In particular, a first mobile terminal MT 1 is utilizing two transport bearers (indicated by the solid lines) via the BAN network 12, while the second mobile terminal MT 2 is utilizing only one transport bearer. The dotted lines indicate common BAN connection management links and the dashed lines indicate dedicated BAN connection management links. As can be gathered from FIG. 5, the BAN network nodes are permanently connected to each other with so-called common BAN connection management links (CBCML). Additionally, for every currently associated mobile terminal one dedicated BAN connection management link (DCBML) is provided between the respective access point and the BAN gateway 3 as well as between the BAN gateway 3 and the BSN 5. Thus, for every transport bearer established between a mobile terminal and the BSN 5, one user plane connection is established between the access point and the BSN 5.

Within the BAN network 12, every access point and BAN gateway should have an IP address. The IP address used inside the BAN network 12 may be a private address. Every access point must be aware of the IP address of the BAN gateway to which it is connected. On the other hand, the BAN gateway 3 must be aware of IP addresses of every access point connected to it. The BAN gateway 3 and the BSN 5 must be able to address each other by an IP address. Thus, the BSN 5 and the BAN gateway 3 are reachable at least via one public IP address known in the agent node. In case access points have private addresses, the user plane connections are routed via a network address translator, which needs to be controlled dynamically by the BAN gateway 3.

Generally, the control plane is terminated in the BAN gateway 3, while the user plane connections may be directly routed between the access points 2 and the BSN 5. The I-3 interface is thus a control only interface connecting the access points 2 to the BAN gateway 3, and the I-4 interface is a combined user and control plane interface connecting the BAN gateway 3 to the BSN 5.

Between each of the access points 2 and the BAN gateway 3 and between each BAN gateway 3 and BSN 5 there is one semi-permanent common BAN connection management link (CBCML). The links between the access points 2 and the BAN gateway 3 and the connection between the BAN gateway 3 and the BSN 5 are independent of each other. A common BAN connection management link is established when the agent node is installed to the network and is re-established at the reset of the agent node. The common control connection uses the signaling protocol transport function on top of dedicated UDP transport connections over IP. This specific CBCML is thus identified between these nodes by the source and destination IP addresses and the source and destination UDP port numbers. In particular, the CBCML is used to exchange the node initialization messages at setup or reset, and to distribute UMTS system information and paging messages. The BAN gateway 3 is responsible for distributing such a system information and pagings over the I-3 interface based on procedures executed in the I-4 interface.

For every mobile terminal having an association with one of the access points 2 in the BAN network 12, a dedicated BAN connection management link (DBCML) is established between the access point 2 and the BAN gateway 3 as well as between the BAN gateway 3 and the BSN 5. This DBCML is similar to the common BAN connection management link but assigned specifically to one mobile terminal. A DBCML is used to initialize itself for a new mobile terminal, to setup and release transport bearers for UMTS data streams, and to release itself. The BAN gateway 3 is responsible for the correct mapping between the DBCMLs of the I-3 interface and the I-4 interface by performing a proper IP address and UDP port number mapping.

For every UMTS data stream conveyed via the BAN network 12, a user plane connection is established. It is noted that one UMTS data stream can carry information belonging to one or several UMTS radio bearers. All data that is exchanged between the BSN 5 and the mobile terminal 1, i.e. both UMTS user plane and UMTS control plane data, is transmitted through the BAN network 12 in these user plane transport bearers. As already mentioned, the user planed connection is directly established between respective one of the access points 2 and the BSN 5, if the possible network layer equipment such as the Network Access protocol Trailer (NAT) is not taken into account.

The user plane utilizes a UDP over IP transport function and is thus identified by the source and destination IP address at a network layer and the UDP port numbers at the transport layer identifying this specific user plane transport bearer. The UDP port numbers are selected from the dynamic range of port numbers. In particular, user plane connections are used to transfer individual UMTS bearer datagrams (UMTS MAC-PDUs) between the access points 2 and the BAN gateway 3 and between the BAN gateway 3 and the BSN 5. Then, in the BSN 5, a transport channel is mapped to one user plane transport bearer. In the access points 2, the user plane transport bearer is mapped further to a logical connection over the air interface I-2 and finally the logical connection is mapped back at the mobile terminal 1 to the UMTS transport channel. The BAN gateway 3 is responsible for network address translation and port mapping of the control plane BAN connection management links as well as for managing the possible mapping between private and public addresses of the user plane transport bearers.

Separate signaling protocol connections are used for each CBCML and DBCML on the I-3 interface and the I-4 interface. The signaling protocol connections are initialized by agent nodes, i.e. an access point in the I-3 interface and the BAN gateway 3 in the I-4 interface, when the agent node is initialized. The first signaling protocol message, which contains the ANCP initialization message, is sent to the manager node known IP-address with the well-known UDP port of the signaling protocol as a destination UDP port. The agent node shall utilize a free UDP port from the dynamic range at its source address. The agent node can also select a suitable IP address as its source IP address. The manager node replies to the initialization message by a message containing a selected IP address and UDP port number from the dynamic range as the source address and the indicated agents IP address and UDP source port as the destination address. After the exchange of these messages, the selected UDP port numbers are used in subsequent communications via the established signaling protocol connection. The signaling protocol connection can be released locally after having successful exchanged ANCP level release messages.

As the BSN 5 is not aware of the structure of the BAN network 12, it only sees the BAN gateway 3. The BAN management is therefore done completely within the BAN network 12.

Figure 6A:
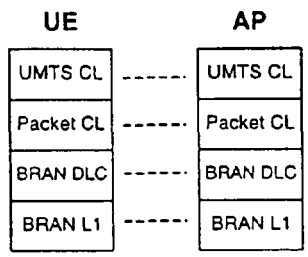
FIG. 6A shows protocol stacks of the air interface with respect to the radio access network user plane.
Figure 6B:
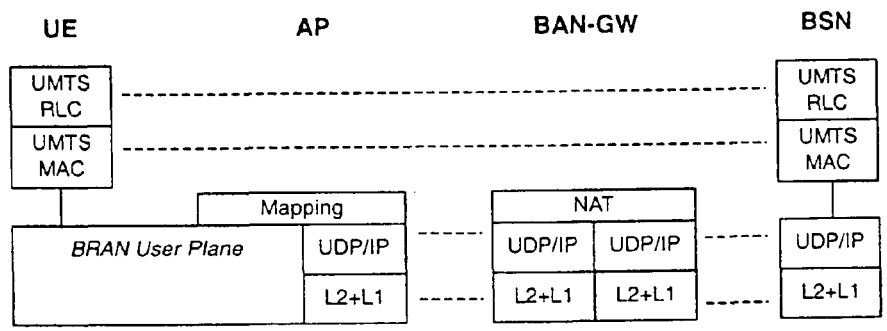
FIG. 6B shows protocol stacks of the air interface with respect to the UMTS Access Stratum User Plane.
Figure 6C:
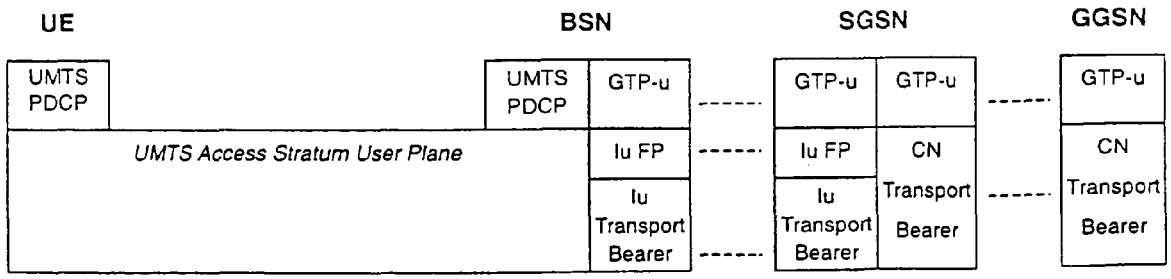
FIG. 6C shows protocol stacks of the air interface with respect to the UMTS Non Access Stratum User Plane.

FIGS. 6A to 6C show protocol stacks of the user plane of the air interface I-2. In particular, FIG. 6A shows the protocol stacks of the BAN user plane at the mobile terminal 1 and the access points 2. As can be gathered from FIG. 6A, the mobile terminal 1 or user equipment (UE) comprises higher layer protocol functions (UMTS CL and Packet CL) for establishing the direct user plane connection between the mobile terminal 1 and the BSN 5. Additionally, lower layer protocol functions (BRN DLC and BRAN L1) are provided for establishing the control plane connection to the BAN network 12. The same applies to the protocol stacks of the access points 2.

FIG. 6B shows the protocol stacks of the UMTS Access Stratum User plane between the mobile terminal 1 and the BSN 5. A stratum defines a grouping of protocols related to one aspect of the services provided by one or several highest-level groups of physical entities. The access stratum is a functional grouping consisting of the parts in the infrastructure and in the user equipment and the protocols between these parts specific to the access technique, i.e. the way the specific physical media between the user equipment and the infrastructure are used to carry information. The access stratum provides services related to the transmission of data over the radio interface and the management of the radio interface to the other parts of the UMTS network 8. As can be gathered from FIG. 6B, the user plane connection is directly established between the mobile terminal or user equipment and the BSN 5 by the air protocol layers UMTS RLC and UMTS MAC. In the lower protocol layers, the access points 2 provide an adaptation or mapping function for mapping the lower layers of the BRAN user plane to the UDP/IP and L2+L1 protocol functions, respectively. In the BAN gateway 3 an additional address and port mapping is performed by the NAT so as to provide the lower layer connection.

FIG. 6C shows the protocol stacks for the UMTS Non Access Stratum User Plane between the mobile terminal 1 and the GGSN 7. In this case, a connection is established via the BAN network 12, the SGSN 6 and the GGSN 7 of the UMTS network 8 to an external network such as the Internet 10. The UMTS Access Stratum User Plane indicated in FIG. 6C is used to route the call to the BSN 5. Based on the higher UMTS PDCP layer in the BSN 5, a mapping to the GPRS protocol layers GTP-u (GPRS Tunneling Protocol), Iu FP (Frame Protocol) and Iu transport bearer is achieved. At the SGSN 6, the Iu FP layer and the Iu Transport Bearer layer are mapped to the transport bearer of the external network.

Figure 7A:
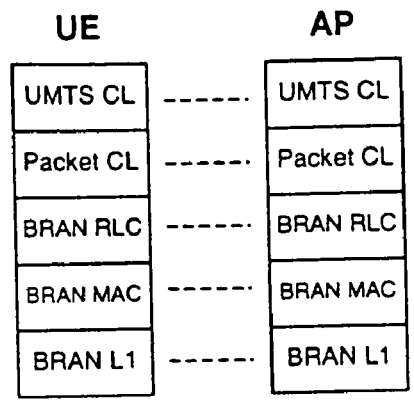
FIG. 7A shows protocol stacks of the air interface with respect to the radio access network control plane.
Figure 7B:
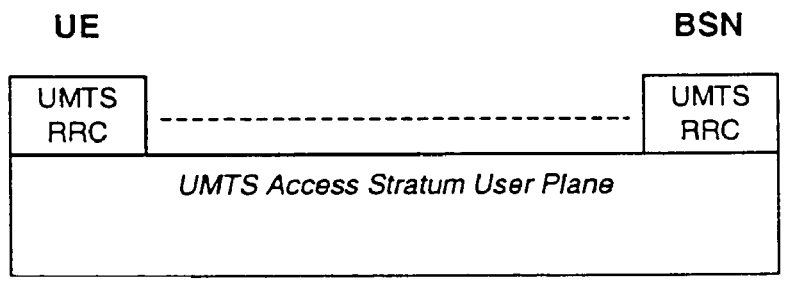
FIG. 7B shows protocol stacks of the air interface with respect to the UMTS Access Stratum Control Plane.
Figure 7C:
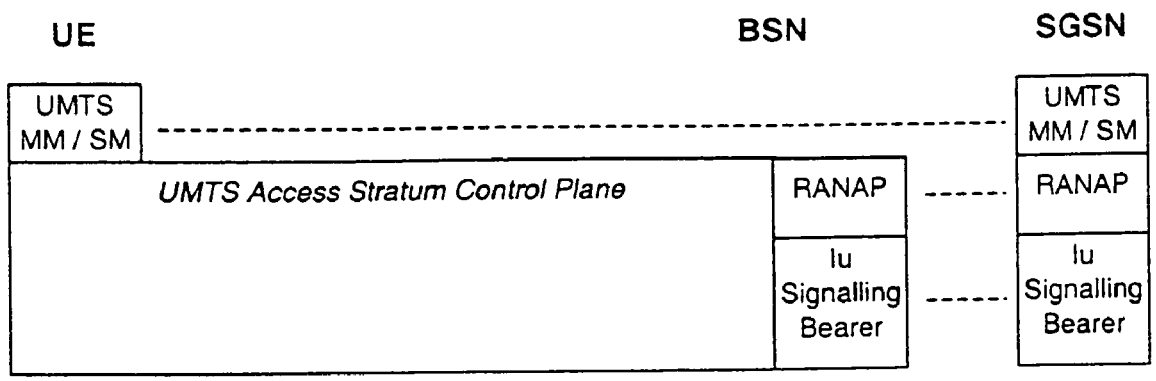
FIG. 7C shows protocol stacks of the air interface with respect to the UMTS Non Access Stratum Control Plane.

FIGS. 7A to 7C show protocol stacks of the control plane of the I-2 interface. As can be gathered from FIG. 7A, the mobile terminal 1 and the access points 2 comprise an additional lower layer BRAN MAC required for the media multiplexing/demultiplexing function of the control plane.

Furthermore, the UMTS Access Stratum Control Plane shown in FIG. 7B provides an additional higher layer UMTS RRC for the radio resource control function at the mobile terminal 1 and the BSN 5. In case of the UMTS Non Access Stratum Control Plane shown in FIG. 7C, additional higher layer mobility management (MM) and security management (SM) UMTS functions are provided in an additional higher protocol layer at the mobile terminal 1 and the SGSN 6. Furthermore, the BSN 5 is arranged to map the protocol layers of the UMTS Access Stratum Control Plane to a Radio Access Network Application Part (RANAP) layer and a Iu signaling bearer required for the corresponding control signaling.

Figure 8:
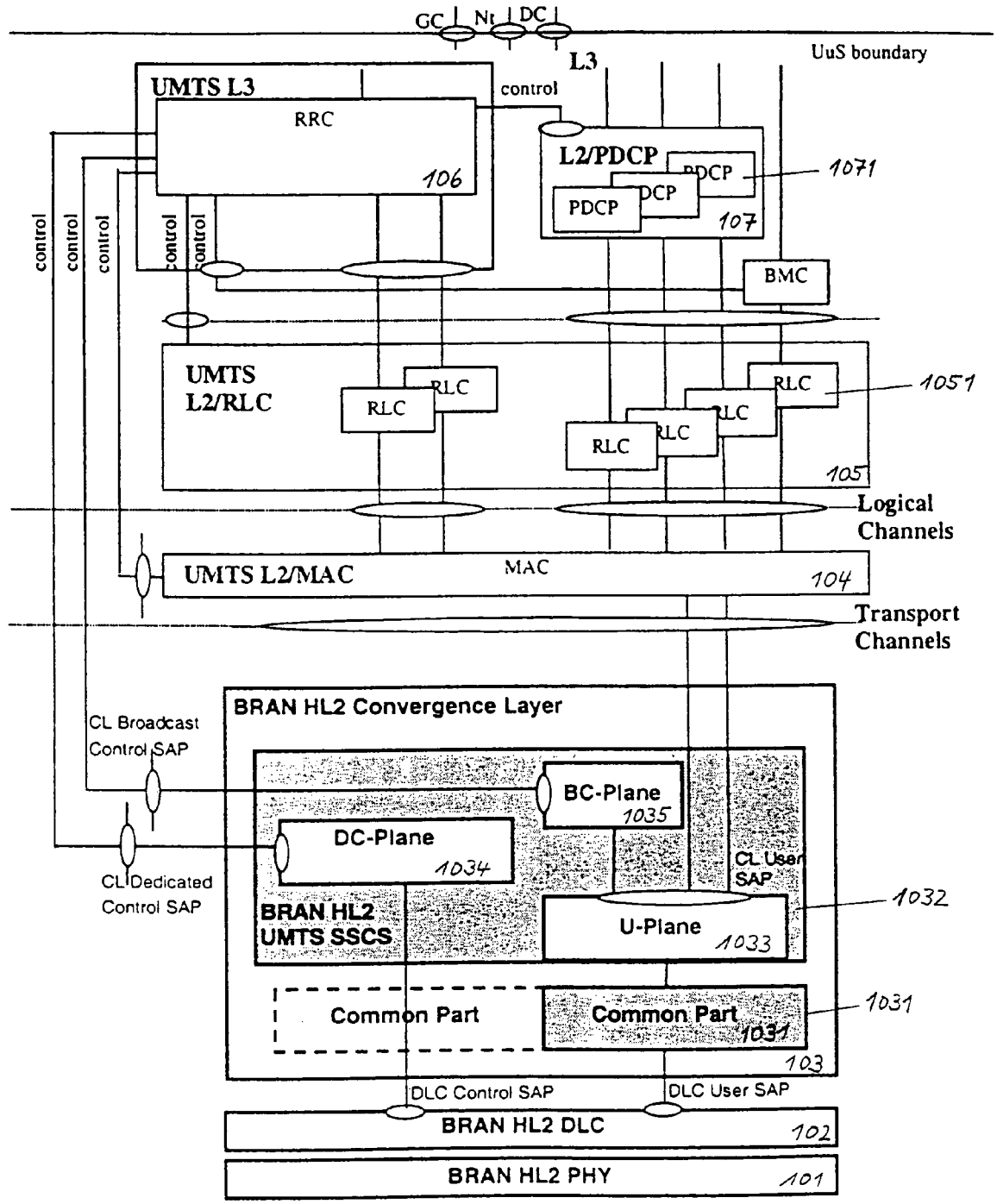
FIG. 8 shows a combined UMTS-HL2 radio interface protocol architecture.

FIG. 8 shows a combined UMTS-HL2 radio interface protocol architecture as provided in the BSN 5, access points 2 and the mobile terminal 1 for the interface function between the UMTS network 8 and the BAN network 12. The Broadband Radio Access Network (BRAN) standardizing of the ETSI denotes a number of technologies suitable for the implementation of broadband radio access networks. Among these technologies, one technology is known as HIPERLAN 2 (HL2). These wireless access networks are intended to support a variety of core networks, including those based on IP. The combined UMTS-HL2 radio interface protocol architecture comprises a BRAN HL2 layer 101, a BRAN HL2 DLC layer 102, a BRAN HL2 convergence layer 103, a UMTS L2/MAC layer 104, a UMTS L2/RLC layer 105, a UMTS L3 RLC layer 106 and a L2/PDCP layer 107.

Compared to the normal UMTS/UTRAN (UMTS Terrestrial Radio Access Network) protocol architecture defined in the ETSI 3GPP specification TS 25.323, the following differences to the UMTS parts can be defined. In the architecture shown in FIG. 8, only the packet switched domain is supported, i.e. all radio bearers are utilizing PDCP protocol services as defined in the ETSI 3GPP specification TS 25.323, "Packet Data Convergence Protocol (PDCP)". Furthermore, only a dedicated transport channel (DCH) of the UMTS architecture can be utilized. In addition thereto, the UMTS CCCH messages are mapped to a DCH transport channel.

The UMTS paging and system information broadcast messages are not transmitted via RLC and MAC protocols, but instead, at the network side, the information of the contents of those messages and additionally necessary scheduling information is directly supplied by the RRC function 106 to the BRAN HL2 UMTS convergence layer 103 via the broadcast control SAP (Service Access Point). In the mobile terminal 1 or user equipment (UE), the system information and paging messages are received by the RRC function 106 directly from the BRAN HL2 UMTS convergence layer 103 via the broadcast control SAP. In particular, the BRAN HL2 convergence layer 103 comprises a common part 1031 through which a DLC User SAP signaling is routed to a U-plane 1033 of the BRAN HL2 UMTS SSCS (Service Specific Convergence Sublayer). Furthermore, the DLC control SAP signaling is routed to a DC 1034 which it is directly routed to the UMTS L3 RRC 106. The U-plane 1033 the broadcast signaling is routed via a BC-plane 1035 to the UMTS L3 RRC 106. In contrast thereto, the TL user SAP signaling is routed from the U-plane 1033 via the UMTS L2/MAC layer 104 to respective RLC functions 1051 of the UMTS L2/RLC layer 105. Then, the logical channels are either routed to the UMTS L3 RRC function 106 or to respective PDCP functions 1071 of the L2/PDCP layer 107, based on the multiplexing/demultiplexing function provided at the MAC layer 104 for separating/combining the control and user plane signaling. The UMTS SSCS layer 1032 resides on top of the common part 1031 and the DLC layer 102. It provides a means of using and preserving the UMTS MAC frame over the I-2 radio interface of the BAN network 12. It also manages UMTS broadcast data over the radio interface, e.g. system information and paging messages. In the interface between the higher layers and the UMTS SSCS 1032, UMTS control and user data are transferred as UMTS data streams. In the UMTS SSCS 1032, each UMTS data stream is mapped to a different HL2 DLC User Connection (DUC) of the BAN network 12. Therefore, the DUC IDs used in the BAN network 12 are mapped to UMTS data stream IDs. Additionally, connection control between the access points 2 and the mobile terminal 1 are performed in the UMTS SSCS 1032 according to requests from the higher layers of the mobile terminal 1 or external networks. In the connection control process, a HL2 MAC ID is mapped to a UMTS connection ID. Setup and release of UMTS data streams is also performed in the UMTS SSCS 1032.

The broadcast procedure of UMTS broadcast data is performed in the respective UMTS SSCS function of the access points 2. The UMTS broadcast data are received from external networks and converted to a UMTS data stream in the UMTS SSCS according to their scheduling information received from the external networks. The UMTS data stream is then broadcast over the 12 interface. The UMTS SSCS 1032 is also responsible for mapping UMTS system frames to HL2 frames of the BAN network 12.

To perform all UMTS SSCS functions, the UMTS SSCS 1032 is subdivided into the U-Plane (User plane) 1033, the BC-Plane (Broadcast Control plane) 1035 and the DC-Plane (Dedicated Control plane) 1034. It is to be noted that the Common Part 1031 is transparent to the DC-Plane 1034. The procedures of the U-Plane 1033 provide the capability to transfer UMTS SSCS SDUs (Service Data Units) between the UMTS SSCS of the access points 2 and one or more UMTS SSCSs of mobile terminals associated with the access points 2 over the BAN network 12. To achieve this, the U-Plane 1033 comprises a transfer function for transferring UMTS control and user data from/to the higher layers and the BC-Plane 1035 and from/to the lower layers, and mapping functions for mapping UMTS connections and UMTS data streams of the higher layers to the HL2 connections and HL2 DLC connections, respectively, of the lower layers based in their respective IDs.

The BC-Plane 1035 handles UMTS broadcast data based on asymmetric procedures which differ in the mobile terminal 1 and in the access points 2 due to their broadcast receiving and transmitting nature, respectively.

Finally, the DC-Plane 1034 is responsible for the establishment, management and release of UMTS data streams. This comprises indication of UMTS SSCS initialization and triggering of UMTS CL broadcast join, UMTS connection setup, UMTS connection release, UMTS data stream setup and UMTS data stream release procedures.

Figure 9:
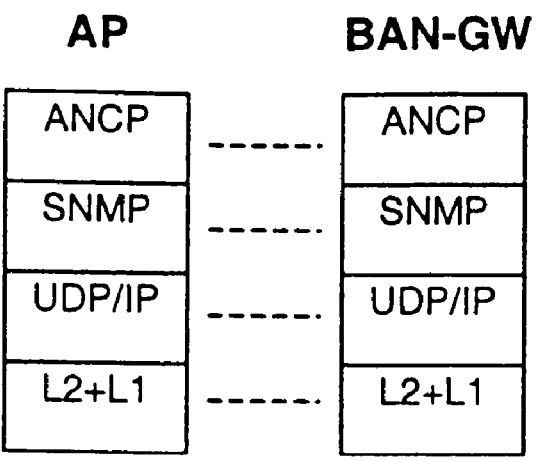
FIG. 9 shows protocol stacks of the interface between the access point and the gateway device with respect to the control plane.

FIG. 9 shows protocol stacks for the I-3 interface between the access points 2 and the BAN gateway 3. In both network elements, the protocol layers comprise an ANCP layer on top of a signaling protocol layer (e.g. SMNP as indicated in FIG. 9) on top of an UDP/IP layer on top of L2+L1 layers.

Figure 10:
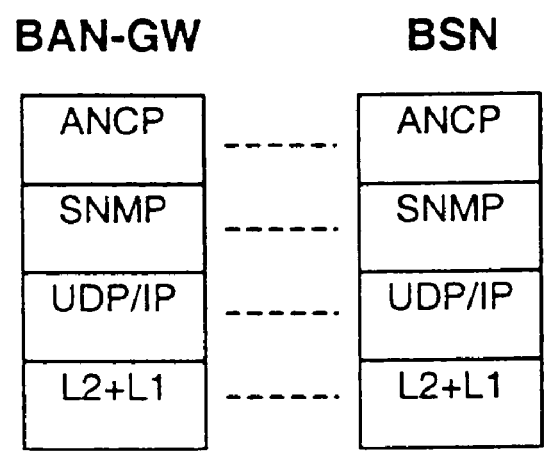
FIG. 10 shows protocol stacks of the interface between the gateway device and the service node with respect to the control plane.

Similarly, as indicated in FIG. 10, the protocol stack of the I-4 interface between the BAN gateway 3 and the BSN 5, comprises the ANCP layer on top of the signaling protocol layer (e.g. SNMP as indicated in FIG. 10) on top of the UDP/IP layer on top of the L2+L1 layer.

Figure 11:
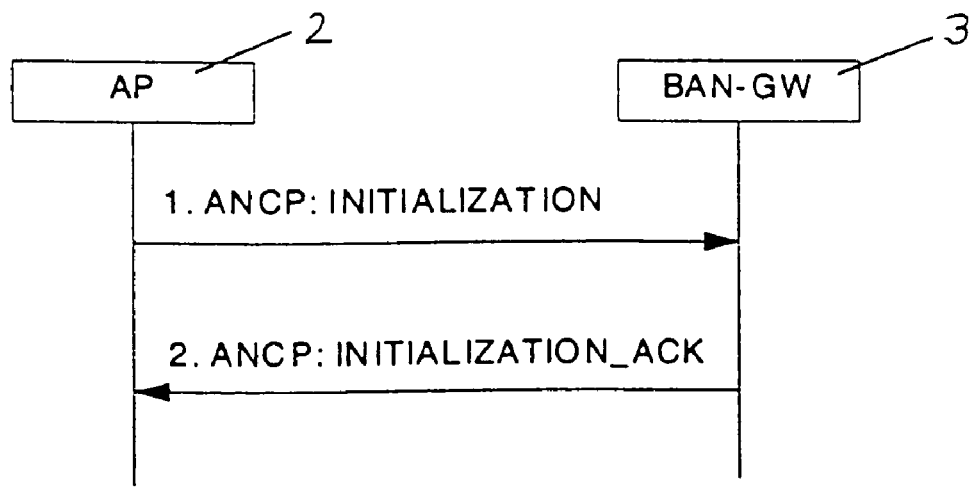
FIG. 11 shows a signaling diagram for an initialization of the access point towards the gateway device.

FIG. 11 shows a signaling diagram for an initialization of an access point 2 towards the BAN gateway 3, wherein an installed or reset access point is connected to the BAN gateway 3. This signaling example shows the required signaling when a new AP is installed to the BAN network 12 or an existing AP has to be reset. The access point has a security association with the connected BAN gateway 3. Thus, security association information is assumed to be pre-configured in the access point.

Upon setup and reset, every access point shall establish a common BAN Connection Management Link to its designated BAN gateway. This signaling connection operates on top of the signaling protocol on top of the UDP/IP transport protocol.

The access point establishes the connection by sending an ANCP INITIALIZATION message to the BAN gateway 3.

The INITIALIZATION message may contain e.g. a list of the supported access specific air interface protocol versions, a list of supported ANCP versions, and an AP node identifier. Reception of INITALIZATION is acknowledged by the BAN gateway 3 with an INITIALIZATION ACK message containing an ID of the selected ANCP protocol version and a BAN gateway node Identifier.

The exchange of these two messages initializes the Common BAN Connection Management Link (CBCML) between the access point and the BAN gateway. The transport addresses for the CBCML are allocated during the initialization procedure by setting the source IP address and source UDP port ID to desired values for the CBCML both in the INITIALIZATION and INITIALIZATION ACK messages.

In addition to the indication of the reset, the Common BAN Connection Management Link (CBCML) will be used to distribute UMTS broadcast information and paging messages to the access points 2 from the BAN gateway 3.

Figure 12:
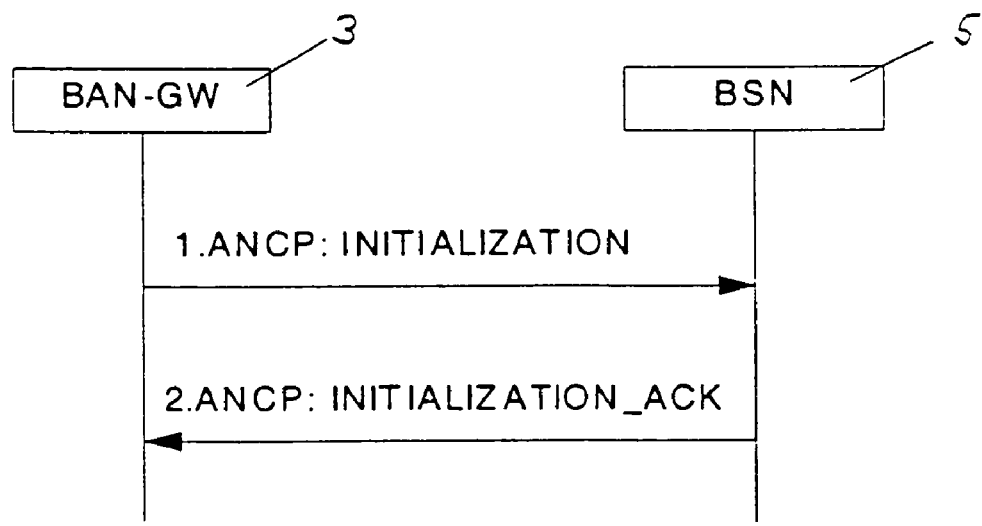
FIG. 12 shows a signaling diagram for the initialization of the gateway device towards the service node.

FIG. 12 shows a signaling diagram for an initialization of the BAN gateway 3 towards the BSN 5. This signaling example shows how the BAN gateway 3 is connected to the BSN 5. One BAN gateway may be connected to several BSNs of the same operator as well as to BSNs in several operators networks.

Similarly to the access points 2, every BAN gateway has a security association with the UMTS operator BSNs to which it is connected. Security association is assumed to be created manually.

Upon setup and reset, the BAN gateway 3 establishes a Common BAN Connection Management Link with its designated BSNs. The setup is performed similarly as in the procedure of AP initialization described in connection with FIG. 11.

Figure 13:
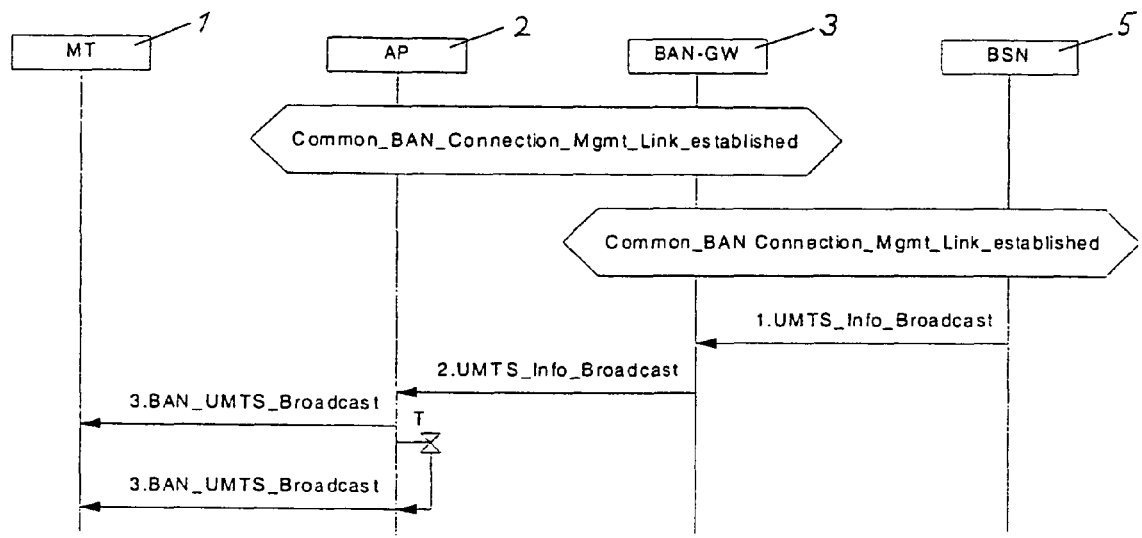
FIG. 13 shows a signaling diagram for a UMTS information broadcasting over the access system according to the preferred embodiment.

FIG. 13 shows a signaling diagram for a UMTS information broadcasting over the BAN network 12. UMTS Information Broadcasting is used to broadcast UMTS specific information over the access specific I-2 radio interface. UMTS information consists of UMTS System Information and Paging messages.

This signaling sequence consists of two parts, a system information distribution to and within BAN network 20 and a system information broadcasting over the air. The distribution of system information within the network utilizes the established Common BAN Connection Management Link (CBCML).

The BSN 5 and the BAN gateway 3 are responsible for the system information distribution towards the access points 2. The BSN 5 sends the UMTS system information to the BAN gateway 3 which then distributes the information towards all connected access points. The BAN gateway 3 may receive system information from a plurality of BSNs from different UMTS or other cellular networks.

The access point is then responsible for periodical UMTS system information broadcasting over the broadband air interface I-2 as specified in the access specific UMTS Convergence layers.

Figure 14:
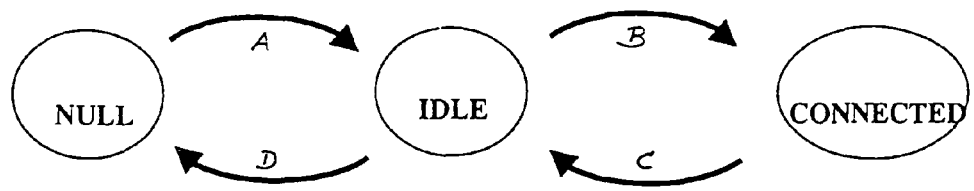
FIG. 14 shows a state transition diagram of the access system according to the preferred embodiment.

FIG. 14 shows a state transition diagram of the mobile terminal 1 according to the preferred embodiment. The mobile terminal 1 can be in three states: NULL, IDLE and CONNECTED. These states describe the state of the connection between the mobile station 1 and the UMTS network 8, and not the state of UMTS protocols.

In the NULL state, the mobile station 1 does not hear the UMTS broadcast information and thus can not know the existence of UMTS coverage and can not connect to UMTS networks. The mobile station 1 transits to the IDLE mode (see arrow A in FIG. 14) when it is switched on and starts listening to UMTS broadcast information from the subscribed UMTS network. The mobile station 1 enters this state either after having found the UMTS Broadcast signal by searching the access specific frequencies or by asking the UMTS broadcast channel information from closest access point.

When the mobile terminal 1 needs to contact the UMTS network 8, it transits to the CONNECTED state (see arrow B). This state is entered after the mobile terminal 1 has an association with the closest access point, has told the subscribed PLMN-ID to the access point and after the BAN network 12 has set messages with the UMTS network 8 by utilizing dedicated transport channels associated to the set up transport bearers.

The mobile terminal 1 enters to IDLE state from CONNECTED state (see arrow C), when the last transport bearer for UMTS data is released and the mobile terminal 1 has been disassociated from the access point. Note that the UMTS connection might still logically exist between the mobile terminal 1 and the UMTS network 8, e.g. in the RRC state URA-Connected.

The mobile terminal 1 enters back to the NULL state (see arrow D) when it is not able to receive any UMTS broadcast information. This might be due to moving away from the coverage of the BAN network 12 or due to switching the power off.

Figure 15:
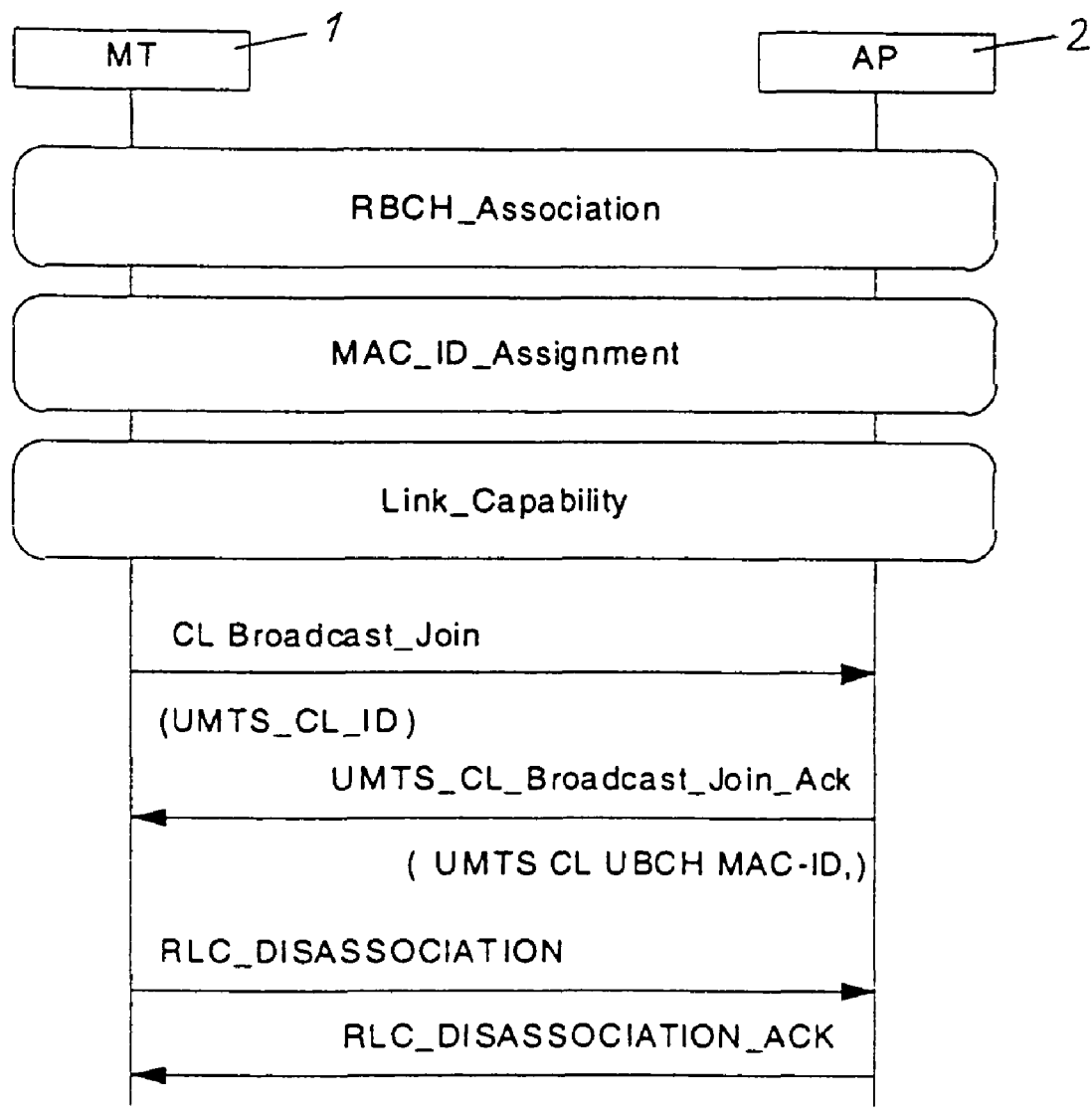
FIG. 15 shows a signaling diagram for a network assisted state transition from a NULL state to an IDLE state.

FIG. 15 shows a signaling diagram for a network assisted state transition from the NULL state to the IDLE state. This state transition can occur without any signaling if the mobile terminal 1 is capable of receiving or finding UMTS System Information broadcasted by the associated access point itself. This is possible since from all access points within one access network the UMTS broadcast should be transmitted in the same channel, or if the mobile terminal 1 finds itself the UMTS broadcast stream by scanning the access frequencies.

If the mobile terminal 1 is not capable of finding itself the UMTS Broadcast information from the closest access point supporting connectivity to UMTS network 8, the following signaling should be executed to request the BAN network 12 to indicate the location of the UMTS broadcast information of the subscribed UMTS network 8.

In general, the mobile terminal 1 establishes a communication or data transfer means between itself and a selected one of the access points 2. Then, the mobile terminal 1 asks for information about the availability or location of a cellular broadcast network information. In particular, the mobile terminal 1 may indicate to the selected access point an indicator (e.g. PLMN-ID) indicating the cellular network from which the broadcast data is desired to be received. In response thereto, the BAN network 12 indicates to the mobile terminal 1 the address or similar location information about a cellular network broadcast signal. In case the mobile terminal 1 has indicated the desired cellular network, the BAN network 12 may indicate a pointer to the broadcast information specifically from the desired cellular network. If the communication means is no longer required, it may be released.

In the following, the above general procedure is described in more detail with reference to FIG. 15 for the case of the BRAN HL2 protocol signaling. The mobile terminal 1 initiates the state transition by associating with the closest access point. The set up of access specific encryption or authentication is not necessary. After negotiating the access specific link capabilities, the mobile terminal 1 asks for the location of UMTS broadcast information by sending UMTS_BROADCAST_JOIN RLC message to the access point. This message indicates the PLMN-ID of the UMTS network 8 the broadcast information of which is desired to be received.

The access point responds with a UMTS_BROADCAST_JOIN_ACK message containing the MAC-ID and the scheduling information broadcast information of the subscribed network, e.g. the UMTS network 8.

After this signaling procedure, the mobile terminal 1 is able to find the UMTS Broadcast information from the pointed location and the association with the access point can be removed, since there is no need to establish a connection to the UMTS network 8.

Figure 16:
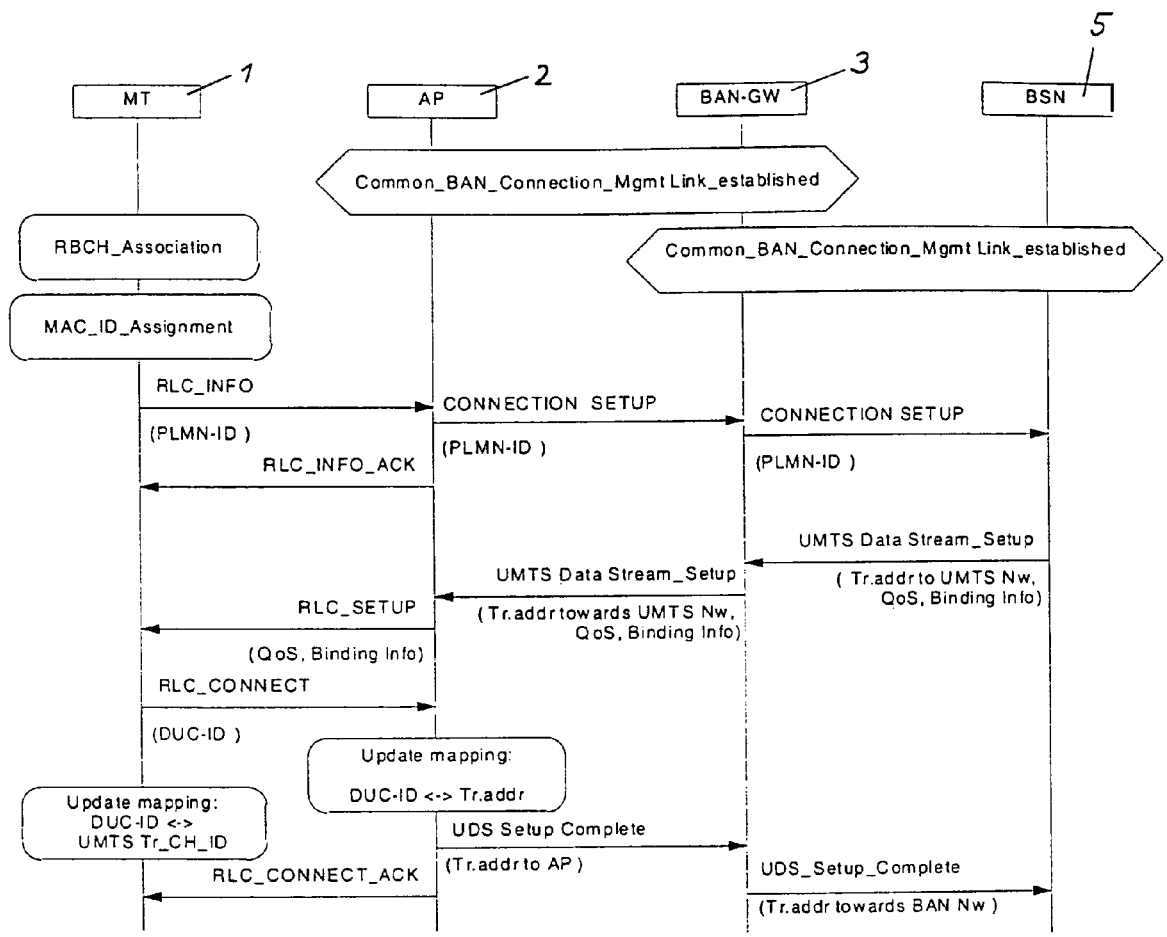
FIG. 16 shows a signaling diagram for a state transition from an IDLE state to a CONNECTED state.

FIG. 16 shows a signaling diagram for a transition from IDLE state to CONNECTED state. This state transition occurs when the mobile terminal 1 needs to contact the UMTS network 8. This can happen e.g. if the mobile terminal 1 receives a paging message or if the mobile terminal 1 needs to contact the UMTS network 8 due to mobile originated reasons.

Figure 17:
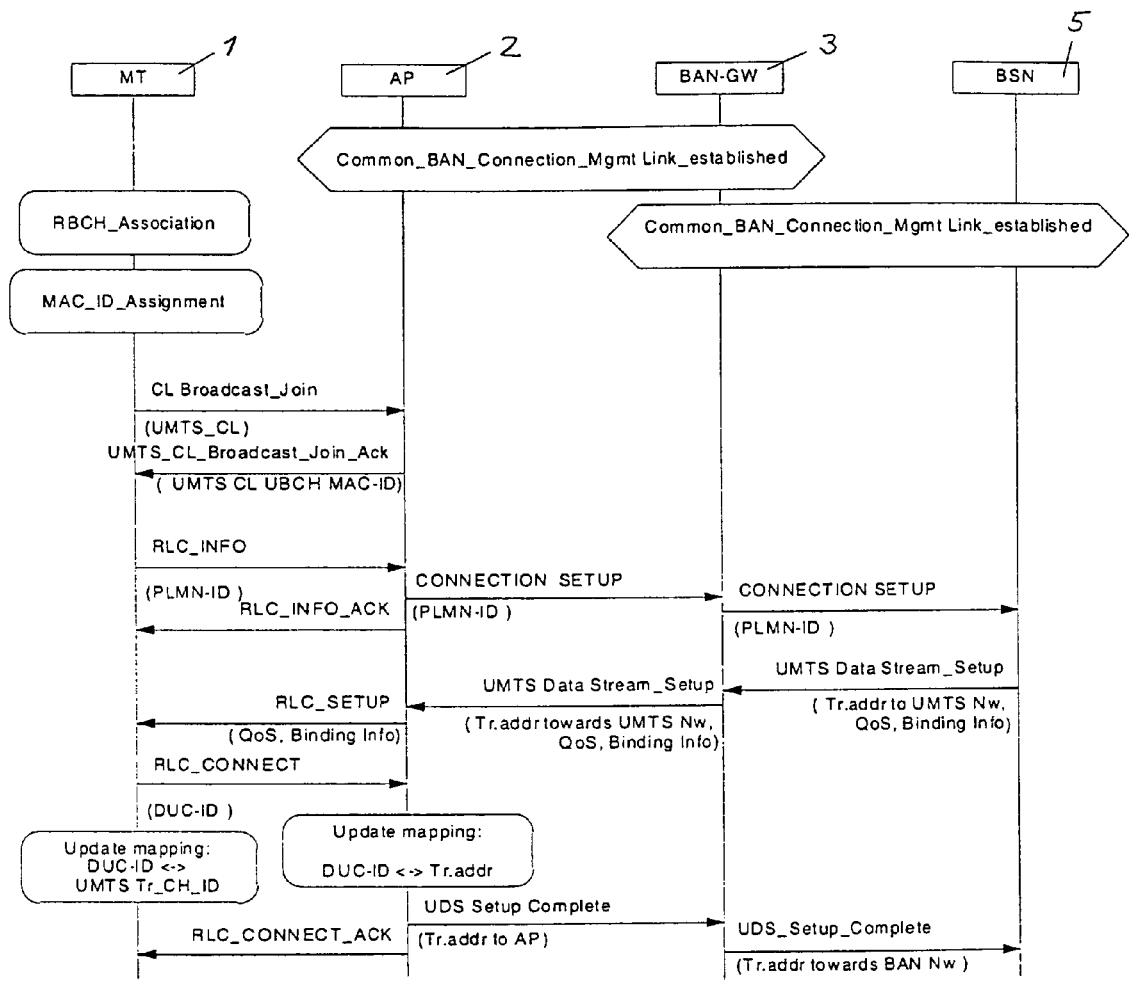
FIG. 17 shows a signaling diagram for a transition from the NULL state to the IDLE state and directly to the CONNECTED state.

In general, the mobile terminal 1 establishes a communication or data transfer means between itself and a selected one of the access points 2. Then, the mobile terminal 1 indicates to the BAN network 12 a cellular network (e.g. the UMTS network 8) towards which a connection is desired. In particular, the mobile terminal 1 may add some cellular network specific information to the respective message. In response thereto, the BAN network 12 indicates to the indicated cellular network the existence of a new mobile terminal desiring to communicate with the cellular network. If a network specific information was received from the mobile terminal 1, it is forwarded to the cellular network in this indication or message. Thereafter, the desired cellular network initiates establishment of a communication or data transfer means between itself and the mobile terminal 1 by requesting or indicating a setup of a transport bearer between itself and the BAN network 12. The desired cellular network may include BAN specific parameters to facilitate the selection of a proper access channel by the BAN network 12 for this connection between the mobile terminal 1 and the desired cellular network. Additionally, the desired cellular network may add a cellular network specific information to this message. The BAN network 12 then establishes access specific communication or data transfer means between itself and the mobile terminal 1, and prepares means to map the established transport bearer to the established access specific communication means. If a cellular network specific information was received from the desired cellular network, it is passed on to the mobile terminal 1 during the establishment of the access specific communication means. Finally, the BAN network 12 completes the establishment of the communication means by indicating the completion of the establishment of the access channel to the mobile terminal 1 and the completion of the establishment of the transport bearer to the desired cellular network. In the following, the above general procedure is described in more detail with reference to FIG. 17 for the case of the BRAN HL2 protocol signaling. The mobile terminal 1 initiates the state transition by associating with the closest access point. After association, mobile terminal 1 sends an RLC_INFO message to the access point. This message indicates the PLMN-ID of the UMTS network towards which the connection shall be established.

In the following, the above general procedure is described in more detail with reference to FIG. 16 for the case of the BRAN HL2 protocol signaling. The mobile terminal 1 initiates the state transition by associating with the closest access point. After association, mobile terminal 1 sends an RLC_INFO message to the access point. This message indicates the PLMN-ID of the UMTS network towards which the connection shall be established.

The access point sends a CONNECTION SETUP message towards the indicated network. The pre-configured transport address for the indicated PLMN-ID is used for this purpose. When the BSN 5 receives the CONNECTION SETUP message, it initializes the establishment of a first transport bearer for the UMTS data streams. This transport bearer will carry at least the initial UMTS signaling bearers between the mobile terminal 1 and the BSN 5.

The BSN 5 initializes the transport bearer setup by sending a UMTS DATA STREAM SETUP message towards the transport address indicated as a source address in the CONNECTION SETUP message. The UDS DATA STREAM message contains e.g. the ID for the UDS to be established, the access specific QoS parameters for the air interface link for this UDS, the desired destination transport address for UDS datagrams to be sent towards the BSN 5 from BAN network 12, the binding information to be passed to the mobile terminal 1 together with the access specific air interface channel establishment.

The access point sets up the access specific link towards the mobile terminal 1 utilizing the indicated. QoS parameters. After successful establishment of the link, the access point responds towards the BSN 5 with a UDS SETUP COMPLETE message containing the desired destination transport address for the UDS datagrams to be sent towards the access point from the UMTS network 8.

After this signaling procedure, an exchange of UMTS messages via the transport channels mapped to the established transport bearers is possible. The mobile terminal 1 knows the allowed transport channels and their mapping to the established transport bearer from the Binding information passed to the mobile terminal 1 together with the establishment of the transport bearer.

Figure 18:
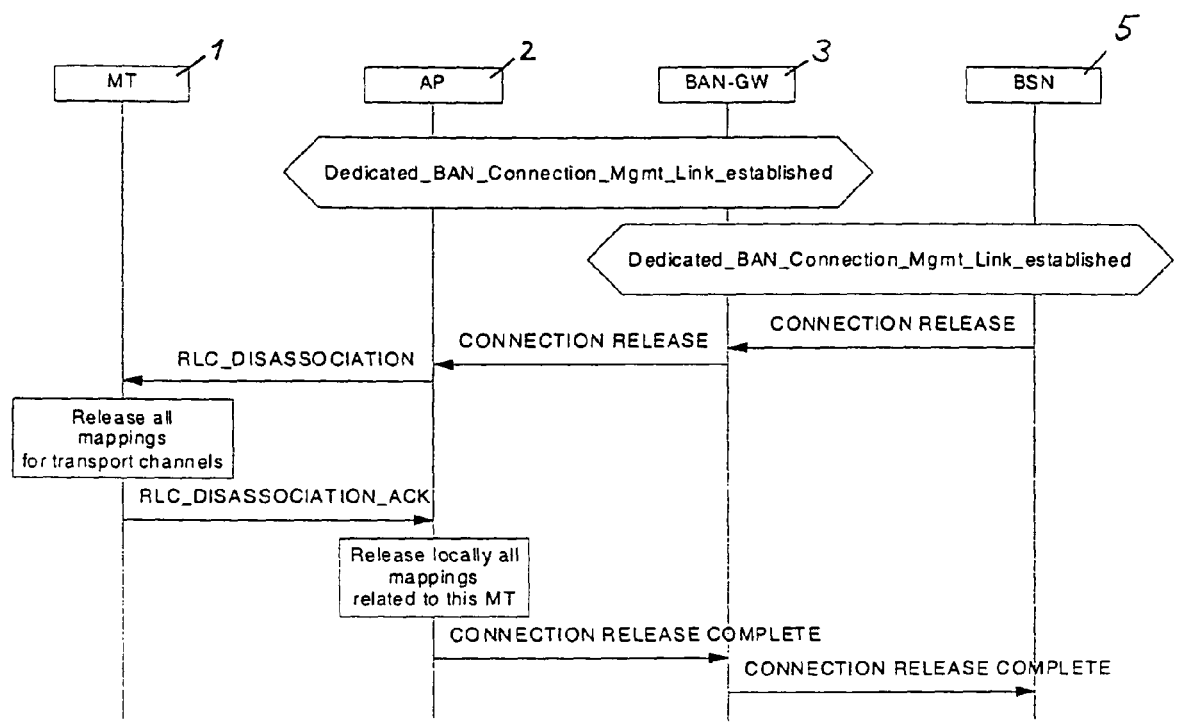
FIG. 18 shows a signaling diagram for a transition from the CONNECTED state to the IDLE state.

FIG. 18 shows a signaling diagram for a transition from the NULL state to the IDLE state and directly to the CONNECTED state. This signaling sequence is utilized when the mobile terminal 1 desires to establish a connection to the UMTS network 8, but is not able to find itself the necessary UMTS broadcast information. In this situation the mobile terminal 1 needs to first ask the network to point out the location of the UMTS broadcast information and then, when transition to the IDLE state is completed, directly transit to the CONNECTED state by establishing a connection to the UMTS network.

This state transition sequence begins similarly as the normal transition from the NULL state to the IDLE state with network assistance. When the UMTS broadcast information is found, the mobile terminal 1 in this case doesn't release the association with the access point but requests the access point to connect the mobile terminal 1 to the UMTS network 8 by issuing an RLC INFO message. This message contains the subscribed PLMN-ID.

After this phase, the signaling is similar as in the transition from the IDLE state to the CONNECTED state shown in FIG. 16. Therefore, the further description is omitted.

Figure 19:
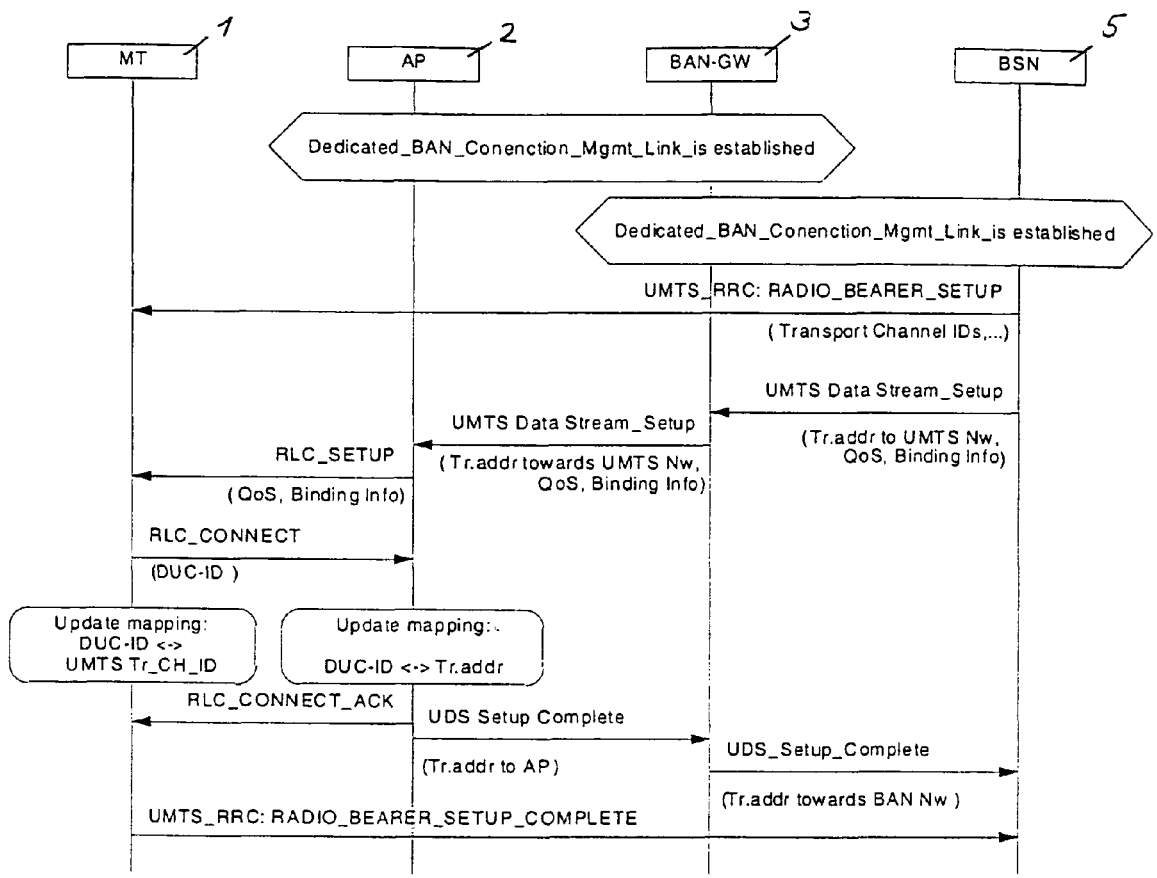
FIG. 19 shows a signaling diagram for a UMTS data stream setup.

FIG. 19 shows a signaling diagram for a transition from the CONNECTED state to the IDLE state. This transition occurs when the physical connection between the UMST network 8 and the mobile terminal 1 is released. Note that the logical connection realized by the UMTS RRC protocol may continue to, exist e.g. in RRC state URA connected.

In the normal case, this state transition is initiated by the BSN 5 when there is no need to further maintain the physical connection to the mobile terminal 1. This can happen e.g. when the RRC connection is released, after handover to another access point or to another radio system or e.g. when the RRC state changes to URA connected. The connection release may also be triggered due to a radio interface congestion of the BAN network 12 or due to a loss of the radio connection to the BAN network 12. In this case a BAN node (either the access point or the BAN gateway 3) starts the signaling sequence by sending a CONNECTION RELEASE REQUEST message towards the BSN 5, after which the BSN 5 initiates the connection release as described below.

The BSN 5 initiates the state transition by issuing a CONNECTION RELEASE message. When the access point receives this message, it disassociates the mobile terminal 1 and releases all information related to the released connection. The mobile terminal 1 also releases all information related to the previously allocated transport bearers. The access point responds towards the BSN 5 with a CONNECTION RELEASE COMPLETE message.

Figure 20:
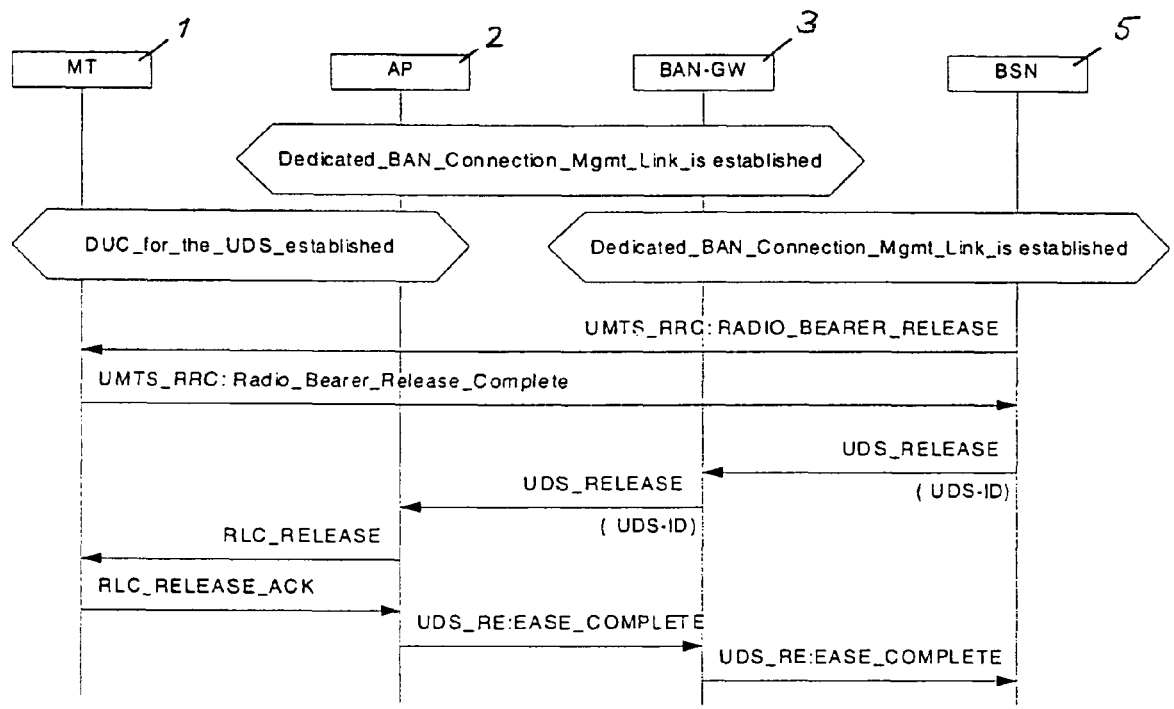
FIG. 20 shows a signaling diagram for a UMTS data stream release.

FIGS. 20 shows a signaling diagram for a UMTS data stream setup operation. This signaling sequence is initiated by the BSN 5 if a transport bearer for a new UMTS data stream needs to be established to carry UMTS radio bearers. Note that several UMTS radio bearers can be multiplexed by the UMTS MAC protocol within one transport bearer and thus a new transport bearer is not usually required for every new UMTS radio bearer.

In general, the concerned cellular network (e.g. UMTS network 8) and the mobile terminal 1 may exchange a cellular network specific signaling required to set up new data streams between themselves. The cellular network initiates establishment of a communication or data transfer means between itself and the mobile terminal 1 by requesting/indicating a setup of a transport bearer between itself and the BAN network 12. The cellular network may add BAN specific parameters to facilitate the selection of a proper access channel by the BAN network 12 for this connection between the mobile terminal 1 and the cellular network. The cellular network may also add a cellular network specific information to this message. The BAN network 12 then establishes access specific communication means between itself and the mobile terminal 1 and prepares means to map the established transport bearer to the established access specific communication means. If a cellular network specific information was received from the cellular network, it is passed on to the mobile terminal 1 during the establishment of the access specific communication means. Thereafter, the BAN network 12 completes the establishment of the communication means by indicating the completion of the establishment of the access channel to the mobile terminal 1 and the completion of the establishment of the transport bearer to the cellular network. The cellular network and the mobile terminal 1 may then exchange a cellular network specific signaling to set up new data streams between themselves.

In the following, the above general procedure is described in more detail with reference to FIG. 20 for the case of the BRAN HL2 protocol signaling. Initially, an RRC RADIO BEARER SETUP message (or other RRC message having similar radio bearer setup function) is sent to the mobile terminal 1, and an ANCP UDS SETUP message is sent to the BAN gateway 3. The BAN gateway 3 then initiates a corresponding UDS setup towards the access point. The UDS SETUP message contains e.g. the ID for the UDS to be established, the access specific QoS parameters for the air interface link for this UDS, the desired destination transport address for UDS datagrams to be sent towards the BSN 5 from BAN network 12, the binding information to be passed to the mobile terminal 1 together with the access specific air interface channel establishment The access point sets up the access specific link towards the mobile terminal 1 utilizing the indicated QoS parameters. After successful establishment of the link, the access point responds towards the BSN 5 with a UDS SETUP COMPLETE message containing the desired destination transport address for the UDS datagrams to be sent towards the access point from the UMTS network 8.

After this signaling procedure, the exchange of UMTS messages via the transport channels mapped to the established transport bearers is possible. The mobile terminal 1 knows the allowed transport channels and their mapping to the established transport bearer from the Binding information passed to the mobile terminal 1 together with the establishment transport bearer.

FIG. 20 shows a signaling diagram for UMTS data stream release operation. This signaling sequence is used to release one or several user plane transport bearers. The release of a specific UDS is normally initiated by the BSN 5 and is used to release one or several user plane transport bearers. It is also possible that the BAN network 12 triggers the release of individual UDSs e.g. due to congestion in the air interface or in the network or due to the loss of a radio connection related to the specific UDS. In such a case, a BAN node (access point or BAN gateway) sends an UDS RELEASE REQUEST message towards the BSN 5.

The release is initiated by the BSN 5 by sending an UDS RELEASE message. This message contains the list of UDSs to be released. When the access point receives the message, it releases the related air interface links to the mobile terminal 1. When the air interface links are released the access point acknowledges the completion of the operation towards the BSN 5 by sending a UDS RELEASE COMPLETE message.

Figure 21:
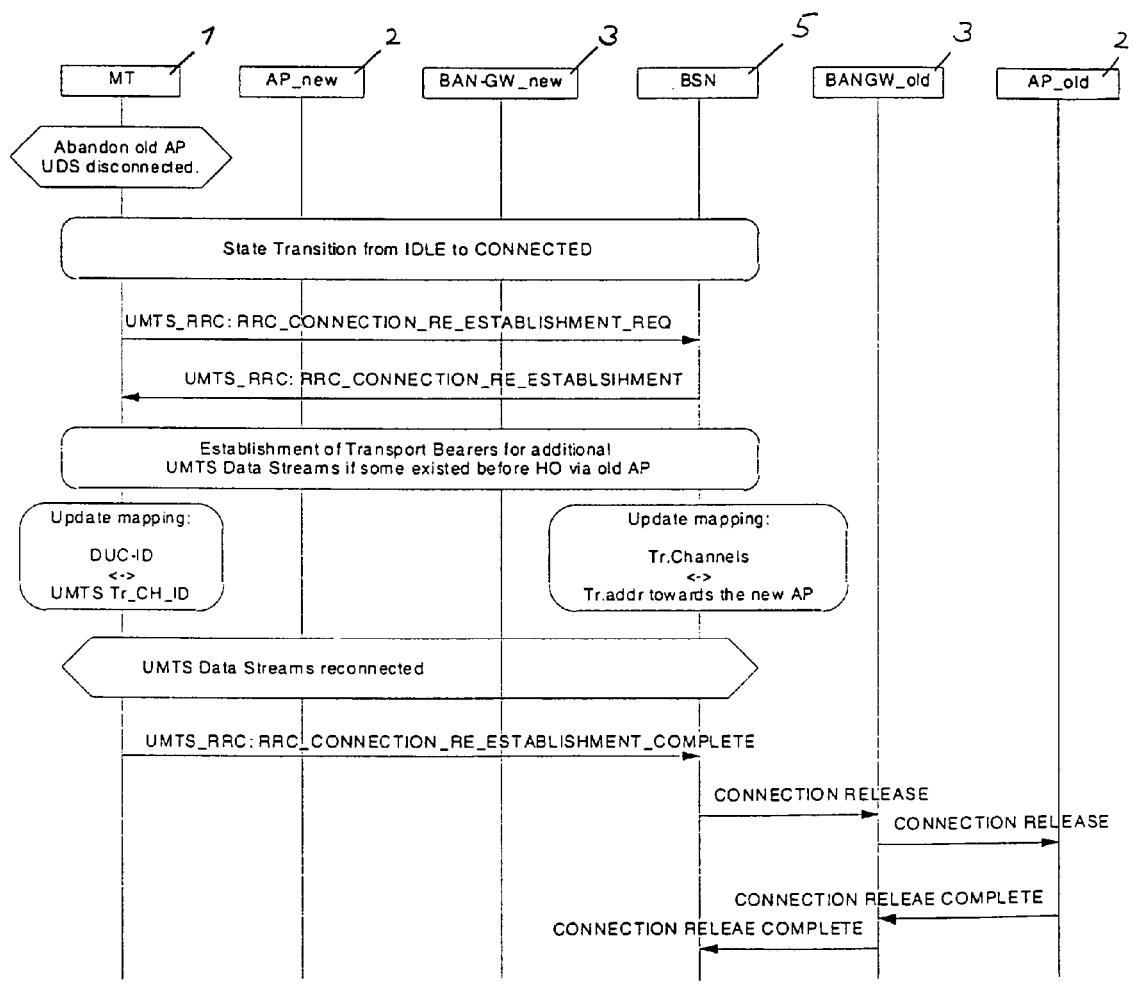
FIG. 21 shows a signaling diagram for a handover procedure.

FIG. 21 shows a signaling diagram for a handover operation between different access points.

In general, the mobile terminal 1 communicates with the BAN network 12 via a first one of the access points 2. The mobile terminal 1 initializes the establishment of a connection to the cellular network (e.g. the UMTS network 8) via a second one of the access points 2. Then, the connection is established between the cellular network and the mobile terminal 1 via the second access point. The mobile terminal 1 indicates its identity and its new point of attachment to the cellular network by transmitting a cellular network specific message from the mobile terminal 1 to the cellular network via the second access point. In response thereto, the cellular network takes the necessary steps to reroute the connection, which was previously routed via the first access point, now via the second access point.

Thus, handover is realized by just abandoning the old access point, associating with a new access point and by indicating the new point of connection to the cellular network (e.g. the BSN 5 of the UMTS network 8) via the new access point. The BSN 5 then redirects all the existing transport bearers towards the new access point. From the point of view of the BAN network 12, this procedure is seen as a new connection establishment and from the point of view of UMTS network 8, this is seen as a re-establishment of the old UMTS RRC connection.

Thus, the BAN network 12 does not handle any handover. From the BAN network point of view there is no handover in the system. The handover is realized by the mobile terminal 1 in such a manner that during communication it preferably scans the signal strength of other access points or access devices and preferably reads the cellular network broadcast information from strong candidate access devices. Then, it just abandons the old access device and starts a normal connection establishment procedure towards a selected new access device. The new connection via the new access device is set up in a normal manner and when the connection between the mobile terminal 1 and the cellular network exists, the mobile terminal 1 signals a message indicating that it has changed its point of attachment to the cellular network to be via the new access device.

In the following, the above general procedure is described in more detail with reference to FIG. 21 for the case of the BRAN HL2 protocol signaling. When the mobile terminal 1 detects that a stronger access point than the current one would be available, it initiates a handover procedure. To achieve this, the mobile terminal 1 first abandons the connection towards the old access point. At this phase, also the user plane connection between the mobile terminal 1 and the UMTS network 8 is broken.

The mobile terminal 1 establishes an association with the new access point. The establishment of the association is executed exactly as for a new UMTS signaling connection. When the UMTS connection between the mobile terminal 1 and the BSN 5 is setup, the BSN 5 automatically initializes the setup of the first transport bearer for the associated mobile terminal 1 also similarly as in UMTS Signaling Connection Setup procedure.

When the first transport bearer is established, the mobile terminal 1 transmits, transparently to the BAN network 12, a UMTS UTRAN RRC Connection Re-establishment Request message to the BSN 5. The BSN 5 recognizes or identifies the mobile terminal 1 from the received RRC message. The RRC message can also be authenticated by the BSN 5 due to the existence of the integrity protection in the message. After successfully detecting the identity of the mobile terminal 1, the BSN 5 switches the broken data flow from the old access point towards the new access point. If more than one transport bearer existed for the mobile terminal 1 via the old access point, then similar transport bearers are setup also towards the new access point. Also if the new access point is connected to a different BSN than the old access point (or if the handover is being made from another radio system), then an SRNS relocation as defined in UMTD is executed between the old and the new BSN.

After this, an RRC message RRC Connection Re-establishment is returned to the mobile terminal 1, which is acknowledged by an RRC Connection re-establishment Complete message. These messages are transparent to the BAN network 12.

It is to be noted that then execution of SRNS Relocation (via standard Iu and Iur interfaces) enables inter BSN, UTRAN to BAN and GERAN to BAN handovers. Normal UTRAN and GERAN inter system handovers are used for BAN to UTRAN and BAN to GERAN handovers.

In summary, the present invention relates to a method and system for providing access to a cellular network, wherein a terminal device is connected to an access device according to access specifications of a broadband access network which is not specifically designed to be used as a part of cellular network. The terminal device indicates to the access device that it wishes to be connected to the cellular network, and a session or call and a radio bearer is setup between the terminal device and the cellular network. To achieve this, a service node provided in the cellular network requests a suitable access bearer from the access network and the access device sets up a corresponding access channel towards the terminal device. The terminal device then associates the access channel to the correct radio bearer by using a corresponding identification. Thereby, service functions of the cellular network, e.g. UMTS services, can be distributed via any access network and existing broadband or high-speed access networks can be implemented in new cellular network structures. A huge capacity enhancement can thus be offered to the network operators of the cellular network without any standardization effort or license fee and at very small investment and maintenance costs.

The present invention can be applied to any access system where a terminal device is to be connected to a cellular network via a access network. The description of the preferred embodiment is only intended to illustrate the present invention. The preferred embodiment may thus be modified within the scope of the attached claims.

The invention claimed is:

1. A method, comprising:
  establishing a wireless connection between a terminal device and a wireless access network which is based on non-licensed frequency band technology;
  indicating by said terminal device to said wireless access network that a connection to a cellular network is required;
  receiving by said terminal device an indication from said wireless access network that a communication with said cellular network is enabled; and
  using said wireless connection to exchange a signaling specific to said cellular network between said terminal device and said cellular network.

2. The method according to claim 1, wherein said signaling specific to said cellular network comprises at least one of system information and paging messages.

3. The method according to claim 1, wherein said communication with said cellular network is performed via a service node connected to a core network of said cellular network.

4. The method according to claim 3, wherein said service node is connected to said core network via an Iu interface.

5. The method according to claim 1, wherein said wireless access network comprises at least one of bluetooth and wireless local area network technology.

6. A method, comprising:
  establishing an access connection between a service node and a wireless access network which is based on non-licensed frequency band technology;
  receiving by said service node an indication from said wireless access network that a terminal device requests a connection to said cellular network;
  transmitting by said service node an indication to said wireless access network that a communication with said cellular network is enabled for said terminal device; and
  exchanging a signaling specific to said cellular network between said terminal device and said service node using said access connection.

7. The method according to claim 6, wherein said signaling specific to said cellular network comprises at least one of system information and paging messages.

8. The method according to claim 6, wherein said service node is connected to a core network of said cellular network.

9. The method according to claim 8, wherein said service node is connected to said core network via an Iu interface.

10. The method according to claim 6, wherein said wireless access network comprises at least one of bluetooth and wireless local area network technology.

11. An apparatus, comprising:
  an establisher configured to establish a wireless access connection between a terminal device and a wireless access network which is based on non-licensed frequency band technology,
  an indicator configured to indicate to said wireless access network that a connection to said cellular network is required, and
  a transceiver configured to receive an indication from said wireless access network that a communication with said cellular network is enabled, and configured to use said wireless access connection to exchange a signaling specific to said cellular network between said terminal device and said cellular network.

12. The apparatus according to claim 11, wherein said signaling specific to said cellular network comprises at least one of system information and paging messages.

13. The apparatus according to claim 11, wherein said apparatus is configured to perform said communication with said cellular network via a service node connected to a core network of said cellular network.

14. The apparatus according to claim 13, wherein said service node is connected to said core network via an Iu interface.

15. The apparatus according to claim 11, wherein said wireless access network comprises at least one of bluetooth and wireless local area network technology.

16. An apparatus, comprising:
  an establisher configured to establish an access connection between a service node and a wireless access network which is based on non-licensed frequency band technology; and
  a transceiver configured to
  receive an indication from said wireless access network that a terminal device requests a connection to said cellular network,
  transmit an indication to said wireless access network that a communication with said cellular network is enabled for said terminal device, and
  use said wireless access connection to exchange a signaling specific to said cellular network between said terminal device and said service node.

17. The apparatus according to claim 16, wherein said signaling specific to said cellular network comprises at least one system information and paging messages.

18. The apparatus according to claim 16, wherein said service node is connected to a core network of said cellular network.

19. The apparatus according to claim 18, wherein said service node is connected to said core network via an Iu interface.

20. The apparatus according to claim 16, wherein said wireless access network comprises at least one of bluetooth and wireless local area network technology.

* * * * *